US012756816B2

(12) United States Patent
Lin et al.

(10) Patent No.: US 12,756,816 B2
(45) Date of Patent: Oct. 6, 2026

(54) BLOCK SELECTION FOR FUSION IN VIDEO CODING

(71) Applicant: QUALCOMM Incorporated, San Diego, CA (US)

(72) Inventors: Jian-Liang Lin, Su'ao Township (TW); Po-Han Lin, Taipei (TW); Vadim Seregin, San Diego, CA (US); Marta Karczewicz, San Diego, CA (US); Yao-Jen Chang, San Diego, CA (US); Zhi Zhang, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 18/633,182

(22) Filed: Apr. 11, 2024

(65) Prior Publication Data

US 2024/0357079 A1 Oct. 24, 2024

Related U.S. Application Data

(60) Provisional application No. 63/588,251, filed on Oct. 5, 2023, provisional application No. 63/496,318, filed on Apr. 14, 2023.

(51) Int. Cl.

*H04N 19/105* (2014.01)
*H04N 19/174* (2014.01)
*H04N 19/176* (2014.01)

(52) U.S. Cl.

CPC ......... *H04N 19/105* (2014.11); *H04N 19/174* (2014.11); *H04N 19/176* (2014.11)

(58) Field of Classification Search

None

See application file for complete search history.

(56) References Cited

U.S. PATENT DOCUMENTS

| | | | | |
|---|---|---|---|---|
| 2022/0038684 | A1 | 2/2022 | Urban et al. | |
| 2024/0137541 | A1* | 4/2024 | Zhao | H04N 19/105 |
| 2025/0008153 | A1* | 1/2025 | Li | H04N 19/159 |
| 2025/0126291 | A1 | 4/2025 | Xu | |
| 2025/0330581 | A1* | 10/2025 | Zhang | H04N 19/105 |
| 2025/0337884 | A1* | 10/2025 | Wang | H04N 19/159 |

(Continued)

FOREIGN PATENT DOCUMENTS

EP 3054678 A1 8/2016

OTHER PUBLICATIONS

Blasi S., et al., "EE2-1.9: TIMD with Directional Blending", JVET-AC0099-v2, Joint Video Experts Team (JVET) of ITU-T SG 16 WP 3 and ISO/IEC JTC 1/SC 29 29th Meeting, by teleconference, Jan. 11-20, 2023, pp. 1-2.

(Continued)

*Primary Examiner* — Chikaodili E Anyikire

(74) *Attorney, Agent, or Firm* — Shumaker & Sieffert, P. A.

(57) ABSTRACT

A method of encoding or decoding video data includes selecting a group of blocks based on probing samples determined from pixels that are proximate to the blocks in the group of blocks and current probing samples determined from pixels that are proximate to a current block; fusing the blocks in the group of blocks to generate a prediction signal; and encoding or decoding the current block based on the prediction signal.

18 Claims, 21 Drawing Sheets

(56) References Cited

U.S. PATENT DOCUMENTS

2026/0019583 A1* 1/2026 Ghaznavi Youvalari .................... H04N 19/12

OTHER PUBLICATIONS

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 2920th Meeting, by Teleconference, Oct. 7-16, 2020, pp. 1-515.
Chen J., et al., "Algorithm Description for Versatile Video Coding and Test Model 10 (VTM 10)", JVET-S2002-v1, Joint Video Experts Team (JVET)of ITU-T SG 16 WP 3 and ISO/IEC JTC 1/SC 29/WG 1119th Meeting: by teleconference, Jun. 22-Jul. 1, 2020, pp. 1-99, JVET-S2002-v2.
Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.
Chen J., et al., "Algorithm Description for Versatile Video Coding and Test Model 4 (VTM 4)", JVET-M1002-v2, Joint Video Experts Team (JVET) of ITU-T SG 16 WP 3 and ISO/IEC JTC 1/SC 29/WG 11 13th Meeting, Marrakech, MA, Jan. 9-18, 2019, pp. 1-64.
Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11 10th Meeting: San Diego, US, Apr. 10-20, 2018, pp. 1-42.
Chen Y-W., et al., "Description of 360° Video Coding Technology Proposal by Qualcomm and Technicolor—Low and High Complexity Versions", JVET-J0021, JVET-F0025, JVET-G0058, Apr. 14, 2018, 4 Pages.
Coban M., et al., "Algorithm Description of Enhanced Compression Model 10 (ECM 10)", JVET-AE2025, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.
Coban M., et al., "Algorithm Description of Enhanced Compression Model 11 (ECM 11)", JVET-AF2025, Joint Video Experts Team (JVET) of ITU-T SG 16 WP 3 and ISO/IEC JTC 1/SC 29 32nd Meeting, Hannover, DE, Oct. 13-20, 2023, pp. 1-85, JVET-AF2025-V1.
Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29 27th Meeting, by Teleconference, Jul. 13-22, 2022, pp. 1-54, JVET-AA2025-v1.
Coban M., et al., "Algorithm Description of Enhanced Compression Model 7 (ECM 7)", JVET-AB2025, Joint Video Experts Team (JVET)of ITU-T SG 16 WP 3 and ISO/IEC JTC 1/SC 2928th Meeting, Mainz, DE, Oct. 20-28, 2022, pp. 1-63.
Co-pending U.S. Appl. No. 18/633,167, filed Apr. 11, 2024.
Filippov A., et al., "Non-EE2: LIC Extensions", JVET-AE0140-v2, Joint Video Experts Team (JVET) of ITU-T SG 16 WP 3 and ISO/IEC JTC 1/SC 29 31st Meeting, Geneva, CH, Jul. 11-19, 2023, pp. 1-4.
International Search Report and Written Opinion—PCT/US2024/024358—ISA/EPO—Jul. 5, 2024.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Karczewicz M., et al., "Common Test Conditions and Evaluation Procedures for Enhanced Compression Tool Testing", JVET-AE2017-v1, Joint Video Experts Team (JVET) of ITU-T SG 16 WP 3 and ISO/IEC JTC 1/SC 29, 31st Meeting, Geneva, CH, Jul. 11-19, 2023, pp. 1-12.
Karczewicz M., et al., "Common Test Conditions and Evaluation Procedures for Enhanced Compression Tool Testing", JVET-AF2017-v1, Joint Video Experts Team (JVET) of ITU-T SG 16 WP 3 and ISO/IEC JTC 1/SC 29 32nd Meeting, Hannover, DE, Oct. 13-20, 2023, pp. 1-12.
Lin J-L., et al., "EE2-1.9: Intra TMP Fusion Probing", JVET-AG0118-v2, Joint Video Experts Team (JVET) of ITU-T SG 16 WP 3 and ISO/IEC JTC 1/SC 29 33rd Meeting, by teleconference, Jan. 17-26, 2024, pp. 1-3.
Lin J-L., et al., "Non-EE2: Intra TMP Fusion Probing", JVET-AF0166-V2, Joint Video Experts Team (JVET) of ITU-T SG 16 WP 3 and ISO/IEC JTC 1/SC 29 32nd Meeting, Hannover, DE, Oct. 13-20, 2023, pp. 1-3.
Lin J-L (Qualcomm)., et al., "Non-EE2: Intra TMP Fusion Probing", JVET-AF0166-v2, Joint Video Experts Team (JVET) of ITU-T SG 16 WP 3 and ISO/IEC JTC 1/SC 29, 32nd Meeting, DE, Oct. 12, 2023-Oct. 20, 2023, Hannover, (The Joint Video Exploration Team of ISO/IEC JTC1/SC29/WC11 and ITU-T SG. 16), p. 1-p. 3, XP030312303, 3 Pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.
U.S. Appl. No. 63/588,251, filed Oct. 5, 2023.
Wang Y-K., et al., "High Efficiency Video Coding (HEVC) Defect Report", JCTVC-N1003-v1, Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 311 Pages, JCTVC-N1003.
Zhang L., et al., "Non-EE2: Intra Template-Matching Prediction Fusion", JVET-AC0069-v2, Joint Video Experts Team (JVET) of ITU-T SG 16 WP 3 and ISO/IEC JTC 1/SC 29, 29th Meeting, by Teleconference, Jan. 11, 2023-Jan. 20, 2023, 32. JVET Meeting, Hannover, (The Joint Video Exploration Team of ISO/IEC JTC1/SC29/WG11 and ITU-T SG.16), No. JVET-AF0166, Oct. 14, 2023, 5 Pages, XP030312303, p. 1-p. 3.
Li J., et al., "Intra Prediction Using Multiple Reference Lines For Video Coding", 2017 Data Compression Conference, 2017, pp. 221-230.

* cited by examiner

| | | |
|---|---|---|
| 1 | 1 | 1 |
| 1 | 8 | 1 |
| 1 | 1 | 1 |

FIG. 11A

| | | |
|---|---|---|
| | 1 | |
| 1 | 4 | 1 |
| | 1 | |

FIG. 11B

| Partition angle | 0 | 2 | 3 | 4 | 5 | 8 | 11 | 12 | 13 | 14 |
|---|---|---|---|---|---|---|---|---|---|---|
| 1st partition | A | A | A | A | L+A | L+A | L+A | L+A | A | A |
| 2nd partition | L+A | L+A | L+A | L | L | L | L | L+A | L+A | L+A |
| Partition angle | 16 | 18 | 19 | 20 | 21 | 24 | 27 | 28 | 29 | 30 |
| 1st partition | A | A | A | A | L+A | L+A | L+A | L+A | A | A |
| 2nd partition | L+A | L+A | L+A | L | L | L | L | L+A | L+A | L+A |

Table 2. Template for the 1st and 2nd geometric partitions, where A represents using above samples, L represents using left samples, and L+A represents using both left and above samples.

FIG. 12

BLOCK SELECTION FOR FUSION IN VIDEO CODING

This application claims the benefit of U.S. Provisional Application No. 63/496,318, filed Apr. 14, 2023, and of U.S. Provisional Application No. 63/588,251 filed Oct. 5, 2023, the entire contents of each of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques (e.g., fusion, filter, and padding) and syntax for the template matching TM related tools. The disclosed methods can be applied as extensions to any of the existing video codecs, such as HEVC (High Efficiency Video Coding), VVC (Versatile Video Coding), Essential Video Coding (EVC) or be an efficient coding tool in future video coding standards (e.g., ECM (Enhanced Compression Model)).

This disclosure describes examples of utilizing more than one pattern and/or process of template determination in template matching, as well as techniques related to weight selection for fusion. For instance, a video coder (e.g., video encoder or video decoder) may use different template types, store more candidates and apply fusion to combine the different candidates. The different candidates may be found through various different techniques. In this manner, the example techniques may improve the functionality of template matching in video coding, which may promote bandwidth and/or processing efficiencies.

For example, for encoding or decoding a current block, a video encoder or decoder may determine a plurality of blocks that the video encoder or decoder fuses to generate a prediction signal for the current block. In one or more examples, the video encoder and the video decoder may determine weights applied to pixels of a block, for fusing, where the weights are based on a respective pixel position of the pixels. By having flexibility to apply different weights based on pixel position, the video encoder and video decoder may generate a prediction signal that is a better approximation of the current block as compared to other fusing techniques to generate a prediction signal.

Moreover, the video encoder and decoder may determine the plurality of blocks (e.g., for fusing or for other video coding techniques) based on template matching, where the video encoder or decoder may filter at least one of a current template for the current block or respective reference templates for the plurality of blocks. By filtering the current template and/or reference templates, the video encoder or video decoder may remove noise in the templates, allowing for a more accurate comparison between the current template and the reference templates for various video coding techniques.

In one or more examples, there may be a plurality of template matching modes, and the video decoder may be configured to select one of the template matching modes. Each of the template matching modes, also called fusion candidates may include a group of blocks. This disclosure describes a probing scheme to determine a template matching mode (e.g., select the group of blocks used for fusing). For example, the probing scheme may involve comparing neighboring pixels to a current block to neighboring pixels to one or more reference blocks, to determine the template matching mode. For example, a video coder may fuse probing samples determined from pixels proximate to blocks in each group of blocks to generate respective fused probing samples for each group of blocks. The video coder may compare current probing samples determined from pixels proximate the current block to the respective fused probing samples to select a group of blocks used for fusing.

In some examples, a list of candidate modes (also called fusion candidate list or list of groups of blocks) may be sorted according to the performance of the probing scheme, and an index value may be coded to indicate which of the candidate modes (e.g., which group of blocks) in the sorted list is to be selected. In this manner, syntax related to the selected candidate mode (e.g., selected group of blocks used for prediction) may be reduced or eliminated, thereby reducing signaling overhead in the bitstream.

In one example, the disclosure describes a method of encoding or decoding video data, the method comprising: determining, for a current block, a plurality of blocks for fusing; determining a respective first weight for two or more pixels of a first block of the plurality of blocks based on a respective position of the two or more pixels of the first block; determining a respective second weight for two or more pixels of a second block of the plurality of blocks; fusing the two or more pixels of the first block and the two or more pixels of the second block based on the respective first weight for the two or more pixels of the first block and the respective second weight for the two or more pixels of the second block to generate a prediction signal; and encoding or decoding the current block based on the prediction signal.

In one example, the disclosure describes a device for encoding or decoding video data, the device comprising: one or more memories configured to store the video data; and processing circuitry coupled to the one or more memories, wherein the processing circuitry is configured to determine, for a current block, a plurality of blocks for fusing; determine a respective first weight for two or more pixels of a first block of the plurality of blocks based on a respective position of the two or more pixels of the first block; determine a respective second weight for two or more pixels of a second block of the plurality of blocks; fuse the two or more pixels of the first block and the two or more pixels of the second block based on the respective first weight for the two or more pixels of the first block and the respective second weight for the two or more pixels of the second block to generate a prediction signal; and encode or decode the current block based on the prediction signal.

In one example, the disclosure describes a method of encoding or decoding video data, the method comprising: determining a current template for a current block based on pixels that neighbor the current block; determining respective reference templates for each of a plurality of blocks; filtering at least one of the current template or the respective reference templates to generate at least one of a filtered current template or respective filtered reference templates; determining respective template matching costs for each of the plurality of blocks based on one of: the filtered current template and the respective reference templates; the current template and the respective filtered reference templates; or the filtered current template and the respective filtered reference templates; and encoding or decoding the current block based on the respective template matching costs.

In one example, the disclosure describes a method of encoding or decoding video data, the method comprising: selecting a group of blocks based on probing samples determined from pixels that are proximate to the blocks in the group of blocks and current probing samples determined from pixels that are proximate to a current block; fusing the blocks in the group of blocks to generate a prediction signal; and encoding or decoding the current block based on the prediction signal.

In one example, the disclosure describes a device for encoding or decoding video data, the device comprising: one or more memories configured to store the video data; and processing circuitry coupled to the one or more memories, wherein the processing circuitry is configured to select a group of blocks based on probing samples determined from pixels that are proximate to the blocks in the group of blocks and current probing samples determined from pixels that are proximate to a current block; fuse the blocks in the group of blocks to generate a prediction signal; and encode or decode the current block based on the prediction signal.

In one example, the disclosure describes a non-transitory computer-readable storage medium storing instructions thereon that when executed cause one or more processors to select a group of blocks based on probing samples determined from pixels that are proximate to the blocks in the group of blocks and current probing samples determined from pixels that are proximate to a current block; fuse the blocks in the group of blocks to generate a prediction signal; and encode or decode the current block based on the prediction signal.

The details of one or more examples are set forth in the accompanying drawings and the description below. Other features, objects, and advantages will be apparent from the description, drawings, and claims.

BRIEF DESCRIPTION OF DRAWINGS

FIGS. 11A and 11B are conceptual diagrams illustrating example filters to be applied for template matching.

FIG. 12 is a table for template for the 1st and 2nd geometric partitions.

DETAILED DESCRIPTION

Figure 1:
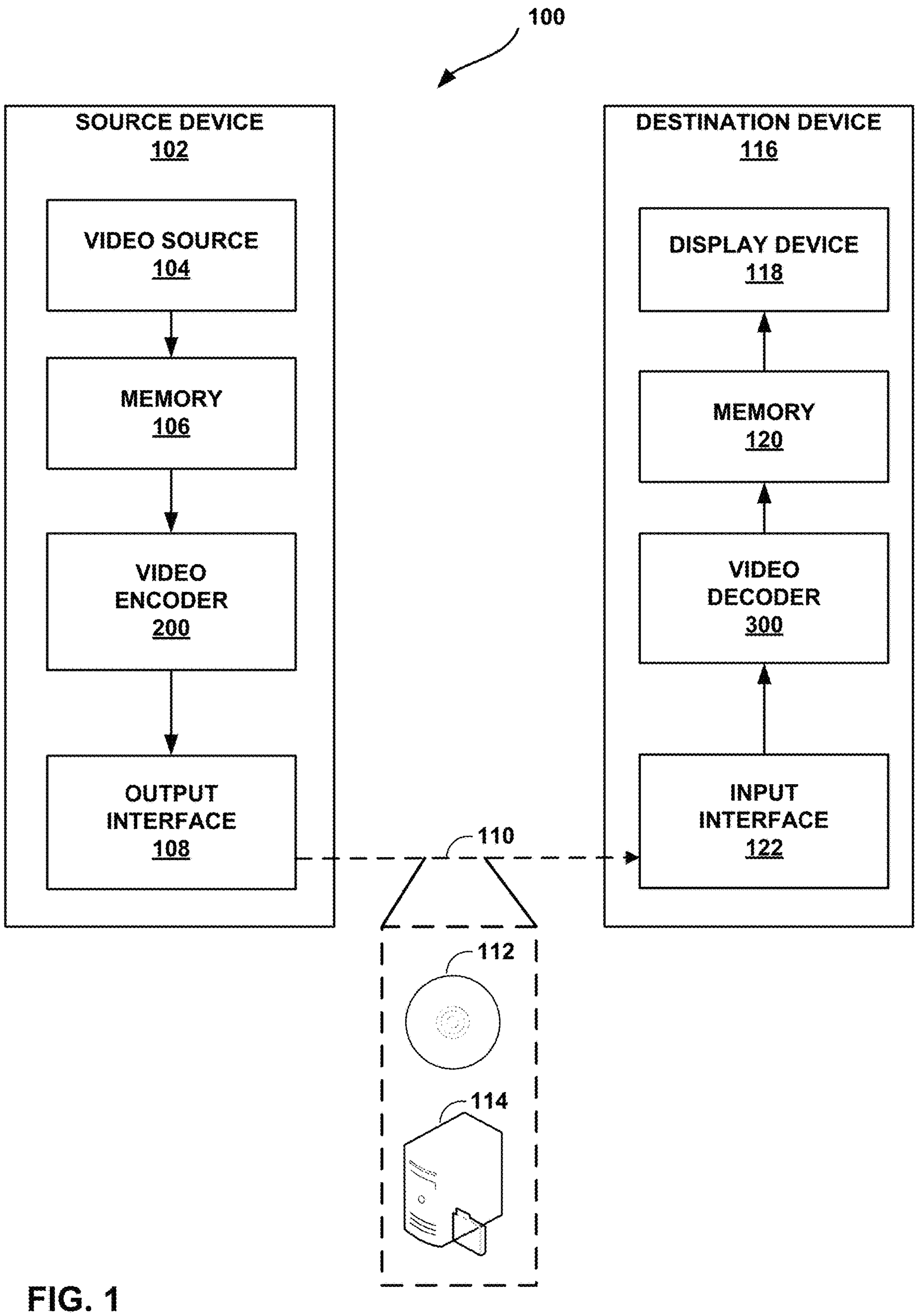
FIG. 1 is a block diagram illustrating an example video encoding and decoding system that may perform the techniques of this disclosure.

Template matching and fusion are example video coding techniques. In template matching, a video coder (e.g., video encoder or video decoder) may compare a current template (e.g., samples proximate a current block in a current picture being encoded or decoded) to a plurality of reference templates (e.g., samples in another picture or other samples in the same picture that neighbor blocks). The plurality of templates may be within a search area/range, may have a particular shape, etc. Based on the comparison, the video coder may perform one or more operations to improve video coding efficiencies. For example, the video coder may update an initial motion vector, update values of prediction samples, reorder a merge list, etc.

This disclosure describes example techniques related to template matching that may improve the functionality of template matching in video coding, thereby improving the overall functionality of a video coding system, including reducing coder complexity, improving coding efficiency, and/or reducing distortion. In one or more examples, the video coder may be configured to filter at least one of the current template or the reference templates, such as by using a low pass filter. The video coder may then the filtered current template, the filtered reference templates, or both the filtered current template and the filtered reference templates for template matching.

As described above, fusion is a video coding technique. In fusion, a video coder determines a plurality of blocks (e.g., using template matching or other techniques), and fuses pixels of the plurality blocks (e.g., fuse top-left pixel in each of the plurality of blocks, fuse the pixel right of the top-left pixel in each of the plurality of blocks, and so forth). To fuse, the video coder may perform a weighted average of the pixels. In one or more examples, rather than assigning one weight all pixels in a first block of the plurality of blocks, the video coder may assign weights to pixels in the first block based on a respective position of the pixels in the first block. The video coder may similarly assign weights to pixels in the other blocks, but assigning weights in this manner to the other blocks is not necessary in all examples. In this manner, the video coder may generate a prediction signal that is better approximation of the current block, as compared to other fusion techniques, resulting in reduced signaling for information of residual values indicating a difference between the prediction signal and the current block.

There may be various ways in which to determine the plurality of blocks (e.g., a group of blocks) that are to be used for fusion. The plurality of blocks used for fusion or the group of blocks used for fusion may be referred to as a plurality of prediction blocks or a group of prediction blocks. For example, because the plurality of fusion blocks or the group of blocks are used to generate the prediction signal, the plurality of fusion blocks or the group of blocks may be considered as the plurality of prediction blocks or the group of prediction blocks.

For instance, if there are 15 blocks, a first grouping of blocks used for fusing may be a first group of blocks that includes blocks 0-4, a second grouping of blocks used for fusing may be a second group of blocks that includes blocks 5-9, and a third grouping of blocks used for fusing may be a third group of blocks that includes blocks 10-14. There may be other ways to define the grouping of blocks.

In some examples, the different groups of blocks (e.g., blocks 0-4, 5-9, and 10-14) may be predefined. In some examples, a video coder may determine different groups of blocks (e.g., based on signaling or implicit techniques).

The video coder may determine which group of blocks from these different groups of blocks are to be used for fusing. That is if there are six groups of blocks (e.g., groups 0-3), where each group includes two or more blocks, the video encoder and the video decoder may determine which one of groups 0-3 to use for fusing, and then fusing the blocks within that group to generate the prediction signal for encoding or decoding a current block.

In accordance with one or more examples, a probing scheme may be used to determine a template matching mode (e.g., used to determine which group of blocks to use for fusion). For example, the probing scheme may involve comparing neighboring pixels to a current block to neighboring pixels to one or more blocks (e.g., one or more reference blocks), to determine the template matching mode. As an example, for each groups of blocks (e.g., each of groups 0-3), the video coder may fuse (e.g., weighted average or some other technique) probing samples determined from pixels that are proximate to the blocks in each of the groups of blocks and current probing samples determined from pixels that are proximate to the current block.

For example, assume there are a plurality of groups of blocks including a first group of blocks and a second group of blocks. The video coder may select a group of blocks based on probing samples determined from pixels that are proximate to the blocks in the group of blocks and current probing samples determined from pixels that are proximate to the current block.

The video coder may determine first reference probing samples for respective blocks in a first group of blocks, and fuse the first reference probing samples to generate first fused probing samples. The video coder may determine second reference probing samples for respective blocks in a second group of blocks, and fuse the second reference probing samples to generate second fused probing samples.

The video coder may compare the current probing samples to the first fused probing samples to generate a first comparison value, and compare the current probing samples to the second fused probing samples to generate a second comparison value. For example, the video coder may determine a sum of absolute differences (SAD), sum of squares error (SSE), or some other technique as a way to compare the current probing samples to the first or second fused probing samples to generate the first or second comparison value.

The video coder may select a group of blocks based on at least the first comparison value and the second comparison value. The video coder may then fuse the blocks of the group of blocks to generate the prediction signal for the current block.

As one example, if the first comparison value is less than the second comparison value, then the video coder may select the first group of blocks for fusing. That is if the first comparison value is less than the respective comparison value for all other groups of blocks, then the video coder may select the first group of blocks for fusing. For instance, the video coder may select the group of blocks that corresponds to having the smallest comparison value.

As another example, the video coder may order a list of groups of blocks (also called fusion candidate list), where the first group of blocks is identified at a lower index value, in the list of groups of blocks, than the second group of blocks based on the first comparison value being less than the second comparison value. That is the video coder may order the list of groups of blocks (e.g., fusion candidate list) starting from the group of blocks having the lowest comparison value (e.g., indicating that fused probing samples of the group of blocks are most similar to the probing samples of the current block) to the group of blocks having the highest comparison value (e.g., indicating that the fused probing samples of the group of blocks are least similar to the probing samples of the current block).

The video coder may select the group of blocks based on the list of groups of blocks. For example, a video encoder may signal and a video decoder may receive an index into the list of groups of blocks to select the group of blocks used for fusing.

That is in some examples, a list of candidate modes (e.g., fusion candidate list or list of groups of blocks) may be sorted according to the performance of the probing scheme (e.g., based respective comparison values), and an index value may be coded to indicate which of the candidate modes (e.g., which group of blocks) in the sorted list is to be used for fusing.

In this manner, syntax related to the selected candidate mode (e.g., which group of blocks is selected) may be reduced or eliminated, thereby reducing signaling overhead in the bitstream. For instance, in examples where the group of blocks used for fusing is selected automatically based on which group of blocks had the lowest comparison value, syntax related to selecting the group of blocks may be eliminated.

In examples where the video coder orders the list of groups of blocks (e.g., the fusion candidate list or list of candidate modes) based on the comparison value, there may be reduction in signaling overhead. For instance, the group of blocks having a lower comparison value may be more likely to be selected as the group of blocks that are to be fused compared to other groups. There may be a lower signaling overhead signaling smaller index values into the list of groups of blocks than signaling larger index values. Accordingly, by ordering the list of groups of blocks based on comparison value from least to greatest, there is a higher likelihood that a lower index value is signaled than a higher index value, resulting in reduced signaling overhead, as compared to techniques in which such ordering is not performed.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for template matching related tools for video coding.

Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for template matching related tools for video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template matching.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to albeit reciprocal to the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The latest version of reference software, i.e., VVC Test Model 10 (VTM 10) could be downloaded from: https://vcgit.hhi.fraunhofer.de/jvet/VVCSoftware_VTM. The Versatile Video Coding (VVC) draft specification could be referred to JVET-T2001. Algorithm description of Versatile Video Coding and Test Model 10 (VTM 10.0) could be referred to JVET-T2002.

The following describes intra template matching. Intra template matching prediction (Intra TMP) is a special intra prediction mode that copies the best prediction block from the reconstructed part of the current frame, whose=template (e.g., an L-shaped template) matches the current template. For a predefined search range, video encoder 200 searches for the most similar template to the current template in a reconstructed part of the current frame and uses the corresponding block as a prediction block. Video encoder 200 then signals the usage of this mode, and the same prediction operation is performed by video decoder 300.

Figure 6:
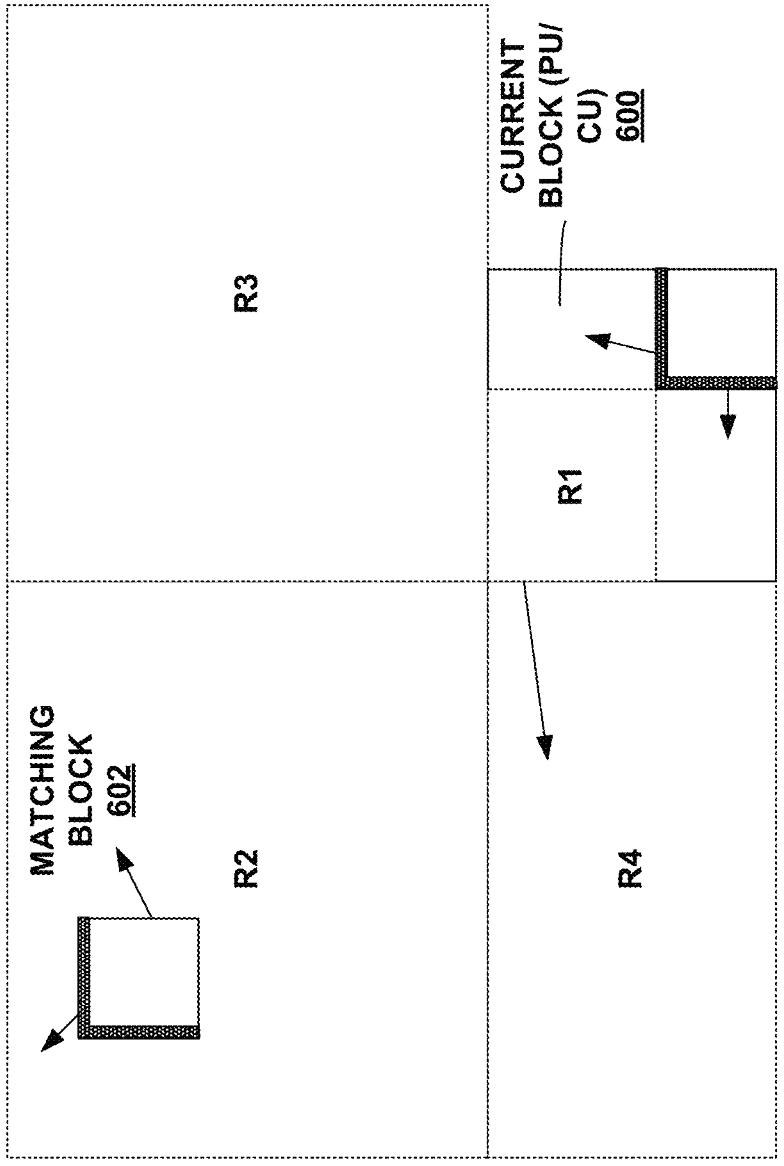
FIG. 6 is a conceptual diagram illustrating an example of intra template matching search area that is used.

The prediction signal is generated by matching the L-shaped causal neighbor of the current block with another block in a predefined search area in FIG. 6 consisting of: R1: current CTU, R2: top-left CTU, R3: above CTU, R4: left CTU. Sum of absolute differences (SAD) is used as a cost function. For instance, FIG. 6 illustrates current block 600, and R2 illustrates matching block 602.

Within each region, video decoder 300 searches for the template that has least SAD with respect to the current one and uses its corresponding block as a prediction block.

The dimensions of all regions (SearchRange_w, SearchRange_h) may be set proportional to the block dimension (BlkW, BlkH) to have a fixed number of SAD comparisons per pixel. That is SearchRange_w=a*BlkW, and SearchRange_h=a*BlkH, where "a" is a constant that controls the gain/complexity trade-off. In some examples, "a" is equal to 5.

The Intra template matching tool may be enabled for CUs with size less than or equal to 64 in width and height. This maximum CU size for Intra template matching is configurable. The Intra template matching prediction mode is signaled at CU level through a dedicated flag when DIMD is not used for current CU.

Figure 7:
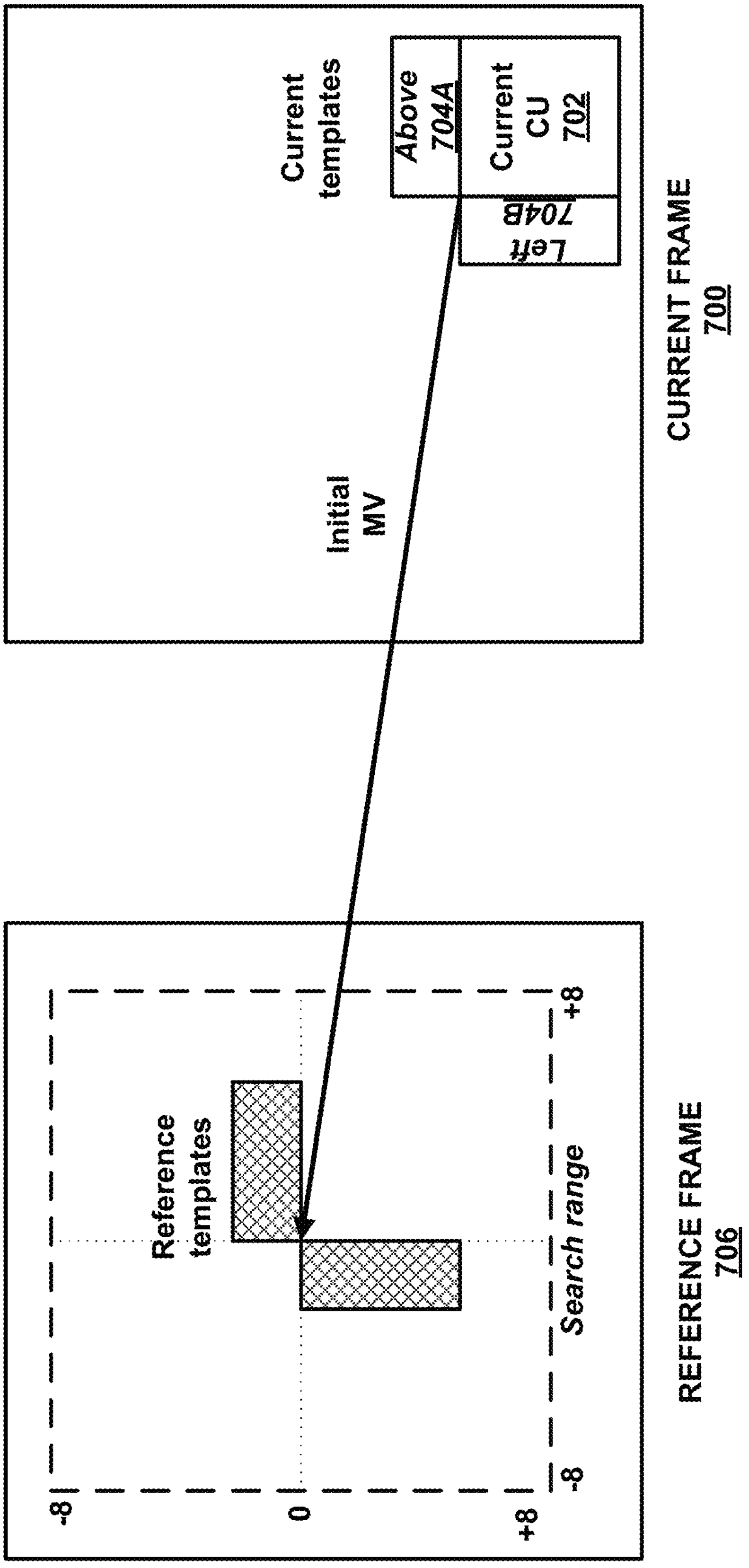
FIG. 7 is a conceptual diagram illustrating an example of template matching on a search area around an initial motion vector (MV).

The following describes inter-template matching. Inter template matching (InterTM) is a decoder-side MV derivation method to refine the motion information of the current CU by finding the closest match between a template (i.e., top and/or left neighboring blocks of the current CU) in the current picture and a block (i.e., same size to the template) in a reference picture. For instance, FIG. 7 illustrates current frame or picture 700, with current CU 702 and templates 704A and 704B, with reference frame or picture 706 with illustrated reference templates. As illustrated in FIG. 7, a better MV is searched around the initial motion of the current CU within a [−8, +8]-pel search range. The template matching method in JVET-J0021 (entitled Description of SDR, HDR and 360° video coding technology proposal by Qualcomm and Technicolor-low and high complexity versions, by Chen et al.) is used with the following modifications: search step size is determined based on AMVR mode and InterTM can be cascaded with bilateral matching process in merge modes.

In AMVP mode, an MVP candidate is determined based on template matching error to select the one which reaches the minimum difference between the current block template and the reference block template, and then InterTM is performed only for this particular MVP candidate for MV refinement. InterTM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR.

| | AMVR mode | | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 1 shows, InterTM may perform all the way down to ⅛-pel MVD precision or skipping those beyond half-pel MVD precision, depending on whether the alternative interpolation filter (that is used when AMVR is of half-pel mode) is used according to merged motion information. In some examples, when TM mode is enabled, template matching may work as an independent process or an extra MV refinement process between block-based and subblock-based bilateral matching (BM) methods, depending on whether BM can be enabled or not according to its enabling condition check.

The following describes adaptive reordering of merge candidates with template matching (ARMC-TM). The merge candidates are adaptively reordered with template matching TM. The reordering method is applied to regular merge mode, TM merge mode, and affine merge mode (excluding the SbTMVP candidate). For the TM merge mode, merge candidates are reordered before the refinement process.

An initial merge candidate list is constructed according to given checking order, such as spatial, TMVPs (temporal motion vector predictors), non-adjacent, HMVPs (history-based motion vector predictors), pairwise, virtual merge candidates. Then the candidates in the initial list are divided into several subgroups. For the template matching TM merge mode, adaptive DMVR (decoder-side motion vector refinement) mode, each merge candidate in the initial list is firstly refined by using TM/multi-pass DMVR. Merge candidates in each subgroup are reordered to generate a reordered merge candidate list and the reordering is according to cost values based on template matching. The index of selected merge candidate in the reordered merge candidate list is signaled to the decoder. For simplification, merge candidates in the last but not the first subgroup are not reordered. All the zero candidates from the ARMC reordering process are excluded during the construction of Merge motion vector candidates list. The subgroup size is set to 5 for regular merge mode and TM merge mode. The subgroup size is set to 3 for affine merge mode.

Figure 8:
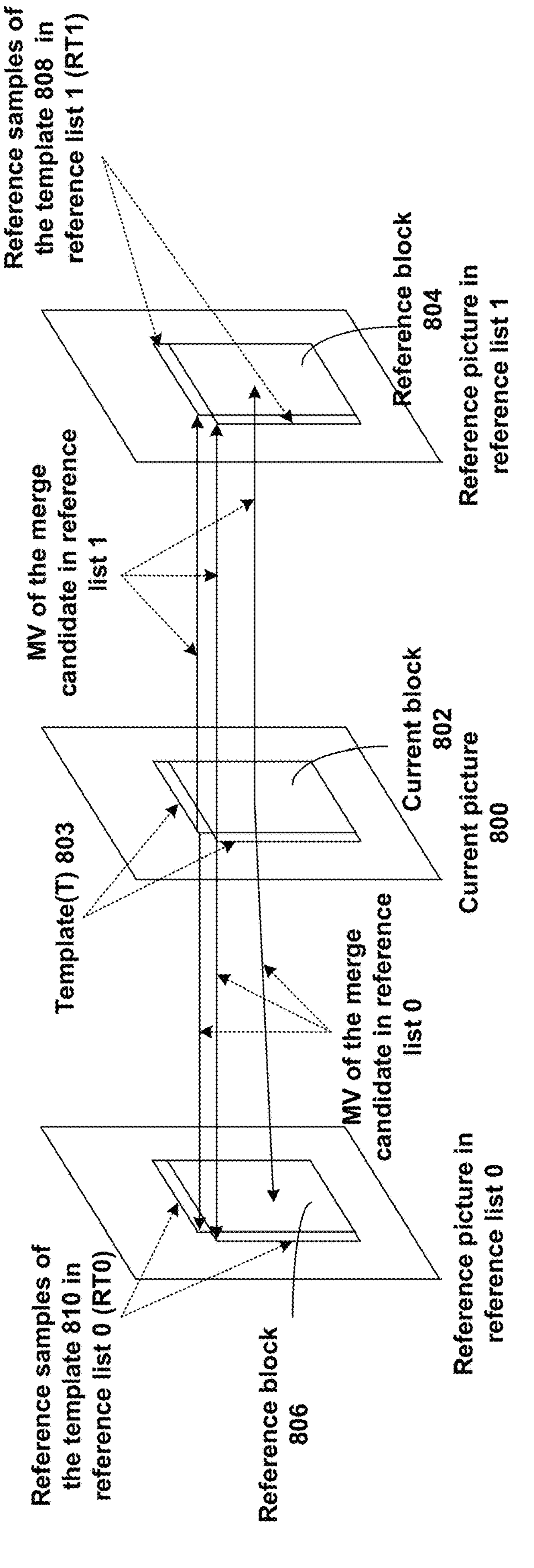
FIG. 8 is a conceptual diagram illustrating an example of template and reference samples of a template in reference pictures.

For the cost calculation, the template matching cost of a merge candidate during the reordering process is measured by the SAD between samples of a template of the current block and their corresponding reference samples. The template comprises a set of reconstructed samples neighboring to the current block. Reference samples of the template are located by the motion information of the merge candidate. When a merge candidate utilizes bi-directional prediction, the reference samples of the template of the merge candidate are also generated by bi-prediction as shown in FIG. 8. For instance, FIG. 8 illustrates current picture 800 with current block 802, and template 803 (e.g., samples proximate current block 802). Reference block 804 is in a reference picture in reference picture list 1, and reference block is in a reference picture in reference picture list 0. Template 808 includes samples proximate reference block 804, and template 810 includes samples proximate reference block 806.

For refinement of the initial merge candidate list, when multi-pass DMVR is used to derive the refined motion to the initial merge candidate list only the first pass (i.e., PU level) of multi-pass DMVR may be applied in reordering. When template matching is used to derive the refined motion, the template size may be set equal to 1. Only the above or left template may be used during the motion refinement of TM when the block is flat with block width greater than 2 times of height or narrow with height greater than 2 times of width. TM is extended to perform 1/16-pel MVD precision. The first four merge candidates may be reordered with the refined motion in TM merge mode.

Figure 9:
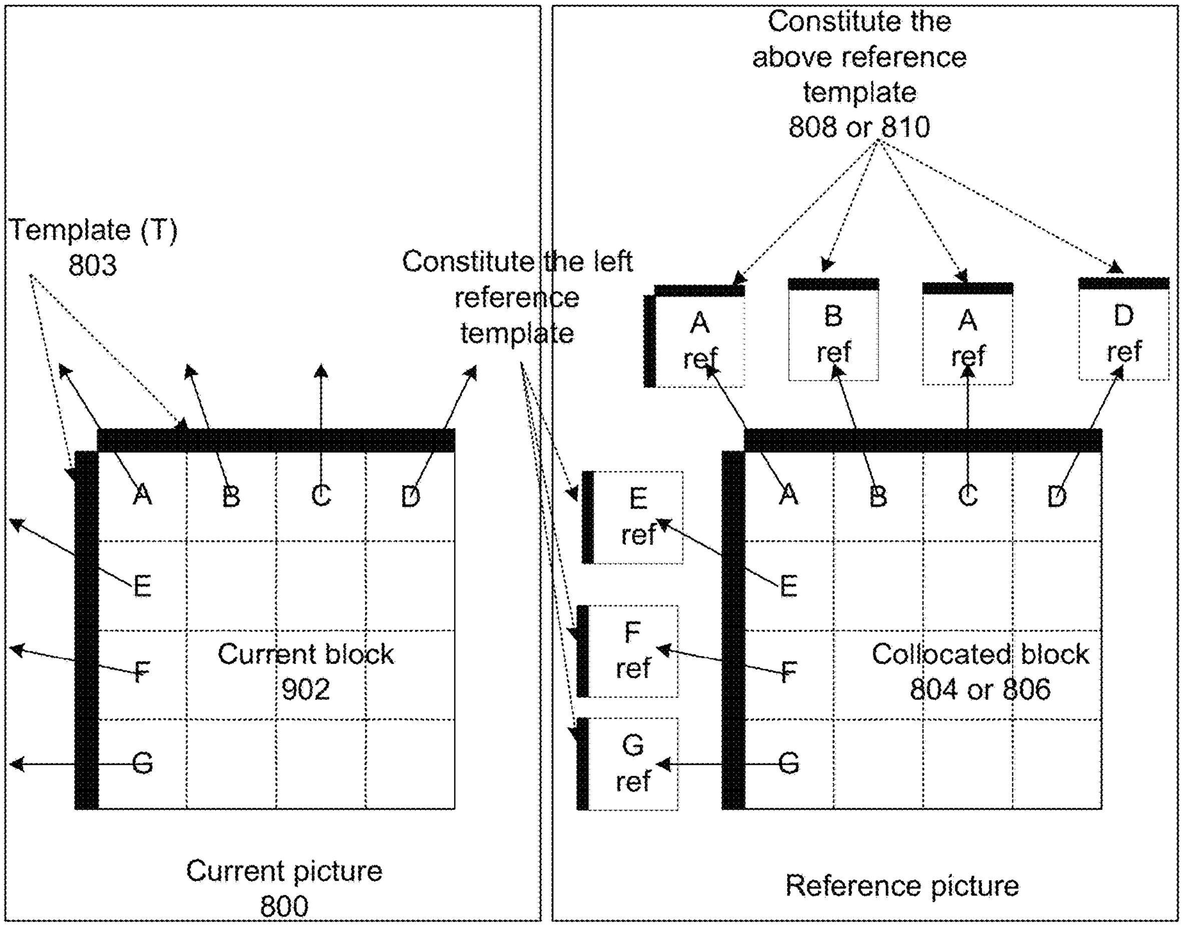
FIG. 9 is a conceptual diagram illustrating an example of template and reference samples for the template for block with sub-block motion using motion information of the sub-blocks of the current block.
Figure 10A:
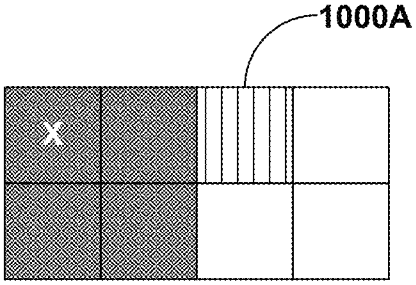
FIGS. 10A-10D are conceptual diagrams illustrating examples of IBC reference region depending on current coding unit (CU) position.
Figure 10B:
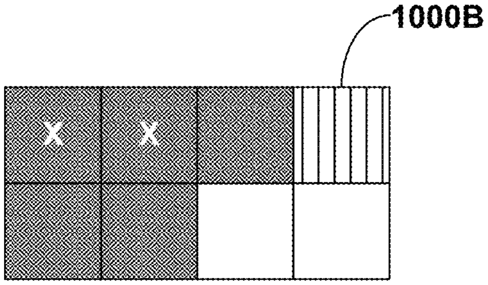
Figure 10C:
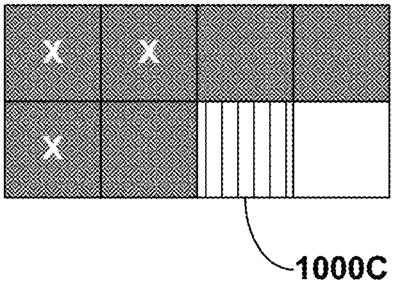
Figure 10D:
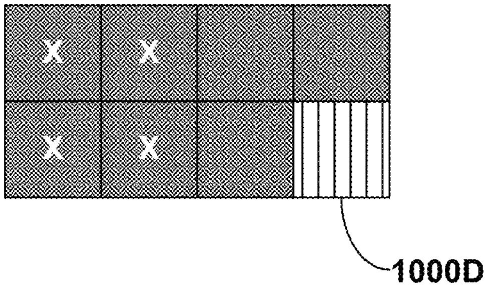

For subblock-based merge candidates with subblock size equal to Wsub×Hsub, the template of FIG. 8 comprises several sub-templates with the size of Wsub×1, and the left template comprises several sub-templates with the size of 1×Hsub. As shown in FIG. 9, the motion information of the subblocks in the first row and the first column of current block is used to derive the reference samples of each sub-template. FIG. 9 uses the same reference numerals as FIG. 8 for ease.

For reordering, in the reordering process, a candidate may be considered as redundant if the cost difference between a candidate and its predecessor is inferior to a lambda value e.g. $|D1-D2|<\lambda$, where D1 and D2 are the costs obtained during the first ARMC ordering and $\lambda$ is the Lagrangian parameter used in the RD criterion at encoder side.

The following algorithm describes example of reordering:

a. Determine the minimum cost difference between a candidate and its predecessor among all candidates in the list
   i. If the minimum cost difference is superior or equal to $\lambda$, the list is considered diverse enough and the reordering stops.
   ii. If this minimum cost difference is inferior to $\lambda$, the candidate is considered as redundant and it is moved at a further position in the list. This further position is the first position where the candidate is diverse enough compared to its predecessor.
b. The algorithm stops after a finite number of iterations (if the minimum cost difference is not inferior to 2).

This algorithm may be applied to the Regular, TM, BM and Affine merge modes. A similar algorithm may be applied to the Merge MMVD and sign MVD prediction methods which also use ARMC for the reordering.

The value of A is set equal to the $\lambda$ of the rate distortion criterion used to select the best merge candidate at the encoder side (e.g., by video encoder 200) for low delay configuration and to the value $\lambda$ corresponding to a another QP for Random Access configuration. A set of $\lambda$ values corresponding to each signaled QP offset is provided in the SPS (sequence parameter set) or in the Slice Header for the QP offsets which are not present in the SPS.

For extension to AMVP modes, the ARMC design is also applicable to the AMVP mode wherein the AMVP candidates are reordered according to the TM cost. For the template matching for advanced motion vector prediction (TM-AMVP) mode, an initial AMVP candidate list is constructed, followed by a refinement from TM to construct a refined AMVP candidate list. In addition, an MVP candidate with a TM cost larger than a threshold, which is equal to five times of the cost of the first MVP candidate, may be skipped. When wrap around motion compensation is enabled, the MV candidate may be clipped with wrap around offset taken into consideration.

The following describes geometric partitioning mode (GPM) with template matching TM. Template matching may be applied to GPM. When GPM mode is enabled for a CU, a CU-level flag is signaled to indicate whether TM is applied to both geometric partitions. Motion information for each geometric partition is refined using TM. When TM is chosen, a template is constructed using left, above or left and above neighboring samples according to partition angle, as shown in Table 2 in FIG. 12. The motion is then refined by minimizing the difference between the current template and the template in the reference picture using the same search pattern of merge mode with half-pel interpolation filter disabled.

A GPM candidate list is constructed as follows. Interleaved List-0 MV candidates and List-1 MV candidates are derived directly from the regular merge candidate list, where List-0 MV candidates are higher priority than List-1 MV candidates A pruning method with an adaptive threshold based on the current CU size is applied to remove redundant MV candidates.

Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates. In some examples, zero MV candidates are padded until the GPM candidate list is full.

The GPM-MMVD and GPM-TM may be exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag is signaled to indicate whether the template matching is applied to the two GPM partitions. Otherwise (at least one GPM-MMVD flag is equal to true), the value of the GPM-TM flag is inferred to be false.

The following describes intra-block copy (IBC) with template matching. Template Matching is used in IBC for both IBC merge mode and IBC AMVP mode.

The IBC-TM merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU.

In the IBC-TM merge mode, the selected candidates are refined with the Template Matching method prior to the RDO (rate-distortion optimization) or decoding process. The IBC-TM merge mode has been put in competition with the regular IBC merge mode and a TM-merge flag is signaled.

In the IBC-TM AMVP mode, up to 3 candidates are selected from the IBC-TM merge list. Each of those 3 selected candidates are refined using the Template Matching method and sorted according to their resulting Template Matching cost. Only the 2 first ones are then considered in the motion estimation process as usual.

The Template Matching refinement for both IBC-TM merge and AMVP modes is quite simple since IBC motion vectors are constrained (i) to be integer and (ii) within a reference region as shown in FIGS. 10A-10D that respectively illustrate current block 1000A-1000D. In IBC-TM merge mode, all refinements are performed at integer precision, and in IBC-TM AMVP mode, they are performed either at integer or 4-pel precision depending on the AMVR value. Such a refinement accesses only to samples without interpolation. In both cases, the refined motion vectors and the used template in each refinement step must respect the constraint of the reference region.

In accordance with one or more examples described in this disclosure, to improve the coding efficiency of template matching, instead of using only one pattern and process of template in TM, template matching techniques may use different template type, store more candidates and apply fusion to combine these different candidates which are found by the different methods.

In the following, for ease of description, if not otherwise stated, the use of the term "TM" can refer to the Intra template matching, inter template matching, adaptive reordering of merge candidates with template matching (ARMC-TM), IBC template matching, or template matching for geometric partitioning mode (GPM). The disclosed methods can be used alone or in any combination.

The following describes examples of fusion of multiple candidates. As one example, the predictor could be generated from a combination of k candidates the k is larger than 1. The k candidates can be selected (e.g., arbitrarily) from the available candidate lists of different template patterns or same pattern.

In some examples, the predictor could be generated from a combination of k candidates. In one example, a linear combination may be used. The 0 to k candidates could be selected from 0 to N candidates from template matching. The combination can be formulated as follows:

$$P_{(x,y)} = \frac{(w_0 * P_{0(x,y)} + w_1 * P_{1(x,y)} + \ldots + w_{k^*} P_{k(x,y)})}{(w_0 + w_1 + \ldots + w_k)}$$

$$P_{(x,y)} = \frac{(w_0 * P_{0(x,y)} + w_1 * P_{1(x,y)} + \ldots + w_k * P_{k(x,y)})}{(w_0 + w_1 + \ldots + w_k)}$$

$$P_{(x,y)} = \frac{(w_0 * P_{0(x,y)} + w_1 * P_{1(x,y)} + \ldots + w_{k^*} P_{k(x,y)})}{(w_0 + w_1 + \ldots + w_k)}$$

where $P_0 \ldots P_k$ are the selected k candidates derived from TM process

In some examples, the combining weight $w_k$ may be derived based on the template matching cost. In one example, it can be the multiplicative inverse of the template matching cost of this candidate k. As another example, the weights are derived based on the SAD, MSE, or block vector (BV).

In some examples, the candidates used in combination can be selected based on the SAD, MSE or block vector (BV) of available candidates. In some examples, there are multiple modes of combination that can be selected and signaled, and a fusion list is constructed to indicate the candidates of fusion for the current block.

In some examples, the number of combination candidates is decided by comparing the cost of the available candidates if the cost of a candidate is similar to the first fusion candidate, the candidate can be added to the combination. For example, there are 3 available candidates A, B and C, if $cost_B < cost_A * Th$, candidate B can be added to the combination with A, and $cost_C < cost_A * Th$, candidate C will not be added to the combination.

In some examples, if the current block uses TM, there is another flag to indicate that whether fusion is applied or not. If fusion is used, another flag is signaled to indicate the index of the fusion list.

In some examples, if the current block uses TM, there is another flag to indicate that whether fusion is applied or not. If fusion is used, another flag is signaled to indicate which model of the fusion weighting derivation is used.

In some examples, if the current block uses TM, there is another flag to indicate that whether fusion is applied or not. If fusion is not used, the information of the pattern type and pattern index may be signaled.

In some examples, the combining weight $\{w_k\}$ are derived by MSE minimization. In the training phase, the templates of those selected candidates and the template of the current are used to derive the weights by MSE minimization. In the fusion phase, the derived weights are used in the linear combination.

In some examples, a flag is signaled to indicate whether the weights derived by the MSE minimization are used in the linear combination. In some examples, a flag is signaled to indicate whether the weights derived by the MSE minimization or the weights derived by the TM costs are used in the linear combination.

In some examples, a flag is signaled to indicate whether the weights derived by the MSE minimization, the weights derived by the TM costs, or other pre-defined weights are used in the linear combination.

In some examples, whether the weights derived by the MSE minimization are used in the linear combination is implicitly derived based on the index of the selected TM candidate. In some examples, whether the weights derived by the MSE minimization are used in the linear combination is implicitly derived based on the size, width, or length of the coding block. In some examples, whether the weights derived by the MSE minimization are used in the linear combination is implicitly derived based on the size, width, or length of the template. In some examples, whether the weights derived by the MSE minimization are used in the linear combination is implicitly derived base on the number of candidates to be fused.

In some examples, a flag is signaled to indicate the weight derivation method and another flag is signalled to indicate the group of candidates to be fused. In some examples, a flag is signaled to indicate whether the weights is derived by the TM costs or the MSE minimization. Another flag is further signalled to indicate which group of candidates are selected in the fusion.

For padding, when the pixel of template is out of slice/picture/tile/CTU boundary or uncoded/uncompressed yet, the pixel can be padded by other pixel. In some examples, the pixel is padded by the above pixel value. In some examples, the pixel is padded by the left pixel value. In some examples, the pixel is padded by the left pixel first. If the left pixel is also out of boundary or uncoded, it is then padded by its above pixel value. In some examples, the pixel is padded by the above pixel first. If the above pixel is also out of boundary or uncoded, it is then padded by its left pixel value.

In some examples, when the pixel of predictor pointed by TM is out of slice/picture/tile/CTU boundary or uncoded/uncompressed yet, the pixel can be padded by other pixel. In some examples, the pixel is padded by the above pixel value. In some examples, the pixel is padded by the left pixel value. In some examples, the pixel is padded by the left pixel first. If the left pixel is also out of boundary or uncoded, it is then padded by its above pixel value. In some examples, the pixel is padded by the above pixel first. If the above pixel is also out of boundary or uncoded, it is then padded by its left pixel value.

For filtering, a filter is applied on the reference frame/pixels before TM. The filter may be an N×M filter, such as a 3×3 filter, examples of which are shown in FIGS. 11A and 11B. The example 3×3 filter may be low-pass filters, but the techniques are not so limited. When applying a 3×3 filter to pixels, video encoder 200 and video decoder 300 may center the filter on each pixel within the pixels, and multiply the value of the filter with the corresponding pixel values in the neighborhood (e.g., around the center of the 3×3 filter). Video encoder 200 and video decoder 300 may sum the result of the multiplication to produce the filtered output value for that pixel.

In some examples, a flag is signaled to indicate whether the filter is applied or not. In some examples, the predictor is also filtered. In some examples, the filter is applied on the template(s). In some examples, the filter is applied on both the reference frame/pixels and the template(s).

For example, FIG. 7 illustrates current CU 702 (i.e., current block 702) that includes current template (e.g., above 704A and left 704B). FIG. 7 also illustrates reference templates. In one or more examples, video encoder 200 and video decoder 300 may determine a current template for a current block 702 based on pixels (e.g., samples) that neighbor the current block 702 (e.g., as illustrated in FIG. 7).

Video encoder 200 and video decoder 300 may also determine respective reference templates for each of a plurality of blocks. For instance, in FIG. 7, the illustrated reference template is a reference template for a block. That is the illustrated reference template, in FIG. 7, includes pixels (e.g., samples) that neighbor a block. Video encoder 200 and video decoder 300 may similarly determine respective reference templates for a plurality of blocks (e.g., within the search range).

In one or more examples, video encoder 200 and video decoder 300 may filter at least one of the current template or the respective reference templates to generate at least one of a filtered current template or respective filtered reference templates. For example, video encoder 200 and video decoder 300 may determine a filtered current template by applying the example filters of FIG. 11A or 11B to the current template (e.g., above 704A and left 704B). Video encoder 200 and video decoder 300 may determine respective filtered reference templates by applying the example filters of FIG. 11A or 11B to the respective filtered reference templates.

In one or more examples, video encoder 200 and video decoder 300 may apply the example filters of FIG. 11A or 11B to the current template of the current block 702 and not to the respective reference templates, to the respective reference templates and not to the current template, or to both the current template and the respective reference templates. Furthermore, the example filter of FIGS. 11A and 11B are two examples, and should not be considered limiting. Also, it may be possible to apply different filters to the current template and the reference templates.

Video encoder 200 and video decoder 300 may determine respective template matching costs for each of the plurality of blocks based on one of: the filtered current template and the respective reference templates, the current template and the respective filtered reference templates, or the filtered current template and the respective filtered reference templates. For example, to determine the respective template matching costs, video encoder 200 and video decoder 300 may determine a sum of absolute difference (SAD) value or mean squared error (MSE) value between each pixel in the filtered current template and each corresponding pixel in the respective reference templates. As another example, to determine the respective template matching costs, video encoder 200 and video decoder 300 may determine a SAD value or MSE value between each pixel in the current template and each corresponding pixel in the respective filtered reference templates. As another example, to determine the respective template matching costs, video encoder 200 and video decoder 300 may determine a SAD value or MSE value between each pixel in the filtered current template and each corresponding pixel in the respective filtered reference templates.

Video encoder 200 and video decoder 300 may encode or decode, as applicable, the current block based on the respective template matching costs. As one example, there may be various coding techniques that use template matching, such as intra-template matching, inter-template matching, adaptive reordering of merge candidates with template matching (ARMC-TM), intra-block copy (IBC) template matching, or template matching for geometric partitioning mode (GPM). Video encoder 200 and video decoder 300 may encode or decode the current block using one of these video coding techniques, where video encoder 200 and video decoder 300 determine the template matching costs for these video coding techniques using the example techniques described in this disclosure.

For TM weighting, the weighting of TM cost for each pixel in the template is location dependent. In some examples, the weighting factor for each pixel is depended on the distance between the pixel in the template and the above-left pixel in current block. In some examples, the weighting factor for each pixel is depended on the horizontal/vertical distance between the pixel in the template and the above-left pixel in current block. In some examples, the weighting factor for each pixel is depended on the (shortest) distance between the pixel in the template and the boundary of the current block.

In some examples, a flag is signalled to indicate whether is the weighting-based TM cost or non-weighting-based TM cost is used. In some examples, the weighting factor for each pixel is depended on the location of the pixel. In some examples, the size of template is signaled in the bitstream. In some examples, a flag is signaled to indicate the size of template.

For position-dependent fusion, the weightings used in the fusion are depended on the position of a pixel (x, y) in the block. For instance, as described above, in fusion, video encoder 200 and video decoder 300 may determine a plurality of blocks (e.g., candidate blocks) that are used for fusing. There may be various ways in which to determine the plurality of blocks. As one example, video encoder 200 and video decoder 300 may compare a current template based on pixels that neighbor the current block to respective reference templates that neighbor respective blocks of a group of blocks. That is video encoder 200 and video decoder 300 may determine template matching costs as described above. Video encoder 200 and video decoder 300 may determining the plurality of blocks for fusing, from the group of blocks, based on the comparison. For example, video encoder 200 and video decoder 300 may select N blocks (e.g., N candidate blocks) from the group of blocks having the lowest template matching cost.

In some examples, video encoder 200 and video decoder 300 may perform filtering as described above to perform the comparison (e.g., determination of template matching costs). For instance, video encoder 200 and video decoder 300 may filter at least one of the current template or the respective reference templates to generate at least one of a filtered current template or respective filtered reference templates. To compare video encoder 200 and video decoder 300 may one of: compare the filtered current template to the respective reference templates, compare the current template to the respective filtered reference templates, or compare the filtered current template to the respective filtered reference templates.

The above describes example techniques to determine the plurality of blocks that are used for fusing. However, there may be other ways in which to determine the plurality of blocks that are used for fusing, such as predefined or signaling techniques.

Video encoder 200 and video decoder 300 may fuse corresponding pixels from each of the plurality of blocks (e.g., fuse top-left pixel of each block, fuse pixel next to top-left pixel of each block, and so forth). The result of the fusing may be a prediction signal.

Video encoder 200 may determine residual values indicative of a difference between the current block and the prediction signal, and signal, in a bitstream, information indicative of the residual values. Video decoder 300 may determine, based on information signaled in a bitstream, residual values indicative of a difference between the current block and the prediction signal, and add the residual values to the prediction signal to reconstruct the current block.

To fuse the pixels of the different blocks, video encoder 200 and video decoder 300 may perform a weighted average. In some techniques, each of the blocks used for fusing may be assigned a respective weight value, and video encoder 200 and video decoder 300 may perform the weighted averaging based on the respective weight value.

However, assigning a constant weight value for all pixels in the blocks used for fusing may result in a prediction signal that is sub-optimal. For instance, the better the prediction signal is approximating the current block, the smaller the residual values between the prediction signal and the current block, resulting in lower signaling overhead for the residual values. In accordance with one or more examples described in this disclosure, rather than having a fixed weight value for all pixels in a block used for fusing, video encoder 200 and video decoder 300 may determine a respective weight for pixels in a first block of the plurality of blocks based on a respective position of pixels in the first block. In some examples, each of the blocks may be assigned a candidate value, and video encoder 200 and video decoder 300 may determine a respective weight for pixels in the first block based on a respective position of pixels in the first block and the candidate value.

Video encoder 200 and video decoder 300 may similarly determine a respective weight for pixels in other blocks of the plurality of blocks used for fusing. However, in some examples, for the other blocks, video encoder 200 and video decoder 300 may set a same weight for each pixel (i.e., assign a weight to the block that is the same for all pixels). Accordingly, the example techniques of determining weights of pixels based on pixel location used for fusing may be applied to one block used for fusing, a subset of blocks used for fusing, or all bocks used for fusing.

For instance, video encoder 200 and video decoder 300 may determine a respective first weight for two or more pixels of a first block of the plurality of blocks (e.g., used for fusing) based on a respective position of the two or more pixels of the first block. For example, a respective first weight for a first pixel of the first block and a respective first weight for a second pixel of the first block is different. As an example, a weight assigned to the top-left pixel of the first block and a weight assigned to the pixel right of the top-left pixel of the first block may be different because the positions of the top-left pixel and the pixel right of the top-left pixel is different.

Video encoder 200 and video decoder 300 may determine a respective second weight for two or more pixels of a second block of the plurality of blocks. In some examples, to determine the respective second weight, video encoder 200 and video decoder 300 may determine the respective second weight for the two or more pixels of the second block of the plurality of blocks based on a respective position of the two or more pixels of the second block. In this example, similar to above, a respective weight for two pixels in the second block may be different because the two pixels have different positions. In some examples, to determine the respective second weight, video encoder 200 and video decoder 300 may set the respective second weight for all of the two or more pixels of the second block to be the same. In this example, the weight applied to each of the pixels in the second block may be constant, and the second block may be considered as having an assigned weight.

Video encoder 200 and video decoder 300 may fuse the two or more pixels of the first block and the two or more pixels of the second block based on the respective first weight for the two or more pixels of the first block and the respective second weight for the two or more pixels of the second block to generate a prediction signal. For instance, video encoder 200 and video decoder 300 may multiply the respective weights for pixels in the first block with the pixel values of the pixels in the first block, multiply the respective weights for pixels in the second block with the pixel values of the pixels in the second block, and divide the result by two to generate the fused value for those pixels that form the prediction signal. There may be other ways in which to perform the fusing. Furthermore, there may be more than two blocks, and the above example of using two blocks is provided for illustration purposes only.

Video encoder 200 and video decoder 300 may encode or decode, as applicable, the current block based on the prediction signal. As described above, video encoder 200 may signal information of residual values indicative of a difference between the prediction signal and the current block. Video decoder 300 may add the residual values to the prediction signal to reconstruct the current block.

The following describes example ways in which video encoder 200 and video decoder 300 may determine the respective weights for the blocks used for fusing (also called candidates or candidate blocks). The example techniques should not be considered limited to following examples.

In some examples, if there are N candidates (i.e., N blocks) for fusing, for each pixel with position (x, y), candidate 0 to i will have higher weight when the x is larger than y, candidate i+1 to N will have higher weight when y is larger than x. For example, the respective position of the two or more pixels of the first block (e.g., one of the N blocks) is defined by a respective x-coordinate and a respective y-coordinate.

Assume that a candidate value for the first block is less than or equal to "i." That is the first block is one of candidate 0 to i. In this example, the weight for a pixel at position (10, 2) in the first block may be greater than the weight for a pixel at position (2, 10) in the first block.

In another example, assume that a candidate value for the first block is greater than "i." That is the first block is one of candidate i+1 to N. In this example, the weight for a pixel at position (2, 10) in the first block may be greater than the weight for a pixel at position (10, 2) in the first block.

In this manner, to determine the respective weight for the two or more pixels of the first block, video encoder 200 and video decoder 300 may determine the respective first weight for the two or more pixels of the first block based on the respective position of the two or more pixels of the first block and a candidate value of the first block. For instance, both the (x, y) coordinate (e.g., whether x is greater than y or vice-versa) and the candidate value (e.g., is the first block candidate 0 to i or candidate i+1 to N) may define the respective weight for two or more pixels of the first block.

In some examples, the value i has a range that 0<=i<N. In some examples, if there are N candidates (e.g., N blocks) for fusing, for each pixel with position (x, y), candidate 0 to i will have higher weight when x is larger than y, candidate i+1 to j will have higher weight when y is larger than x, candidate j+1 to N will use a fixed weight for every pixel. In some examples, the value i, j have a range that 0<=i, j<N.

In this example, if the first block has a candidate value less than "j," then video encoder 200 and video decoder 300 may determine a respective first weight for two or more pixels of a first block of the plurality of blocks based on a respective position of the two or more pixels of the first block. If a second block has a candidate value less than "j," then video encoder 200 and video decoder 300 may determine a respective second weight for two or more pixels of the second block of the plurality of blocks based on a respective position of the two or more pixels of the second block.

However, if the second block has a candidate value greater than j, then video encoder 200 and video decoder 300 may determine a respective second weight for two or more pixels of the second block of the plurality of blocks such that the respective second weight is the same. That is video encoder 200 and video decoder 300 may set the respective second weight for all of the two or more pixels of the second block to be the same.

In some examples, if there are two candidates (e.g., two blocks) are used for using, for each pixel with position (x, y), candidate 0 will have higher weight when x is larger than y, candidate 1 will have higher weight when y is larger than x. In some examples, if there are two candidates going to fuse, for each pixel with position (x, y), the weight of candidate 0 will multiply a ratio of (x/block_width) to derive a new weight for candidate 0, the weight of candidate 1 will multiply a ratio of (y/block_height) to derive a new weight for candidate 1.

That is in some examples, video encoder 200 and video decoder 300 may assign a third weight to a first block of the plurality of blocks that are going to be used for fusing. As above, the respective position of the two or more pixels of the first block includes a respective x-coordinate and a respective y-coordinate. To determine the respective first weight for the two or more pixels of the first block, video encoder 200 and video decoder 300 may be configured to determine a third weight for the first block, and determine a value based on: the x-coordinate and a width of the first block, or the y-coordinate and a height of the first block. Video encoder 200 and video decoder 300 may determine the respective first weight based on the value and the third weight.

As one example, to determine the value, video encoder 200 and video decoder 300 may multiply a ratio of the x-coordinate to the width of the first block with the third weight. As another example, to determine the value, video encoder 200 and video decoder 300 may multiply a ratio of the y-coordinate to the height of the first block with the third weight.

In some examples, if there are two candidates going to fuse, for each pixel with position (x, y), candidate 0 (e.g., first block) will have higher weight when x is larger than y, candidate 1 (e.g., second block) will use a fixed weight for every pixel (e.g., the respective second weight for all of the two or more pixels of the second block is the same). In some examples, if there are two candidates going to fuse, for each pixel with position (x, y), candidate 0 (e.g., first block) will have higher weight when y is larger than x, candidate 1 (e.g., second block) will use a fixed weight for every pixel (e.g., the respective second weight for all of the two or more pixels of the second block is the same).

In some examples, there is a flag to indicate that whether the position-dependent fusion is applied or not. For example, video encoder 200 may signal and video decoder 300 may parse a flag indicating that position-dependent fusion is applied. In such examples, video encoder 200 and video decoder 300 may perform the fusing techniques described in this disclosure in a condition where the flag indicates that position-dependent fusion is applied.

As described above, for fusion, there are a plurality of blocks that are fused together. There may be various ways in which to select a group of blocks that should be fused together. For instance, the above described using template matching techniques to determine the group of blocks that should be fused together. However, in accordance with one or more example techniques described in this disclosure, there may be various other techniques to select the group of blocks that should be used for fusing.

As described in more detail, in accordance with one or more examples described in this disclosure, video decoder 300 may be configured to perform a decoder side probing scheme to select the group of blocks used for fusing. For instance, in some cases, when IntraTMP fusion mode is enabled, a syntax of weights derivation method (which could be based on the template matching cost or based on MSE (mean-squared-error) minimization) and an index of the fusion candidates is signalled to indicate which fusion candidate is used.

In this disclosure, a fusion candidate refers to a group of blocks. That is a first fusion candidate may include a first group of blocks 0-4, a second fusion candidate may include a second group of blocks 5-9, and a third fusion candidate may include a third group of blocks 10-14. This is one example, and there may be more or fewer than three groups, and each group may include more or fewer than five blocks. For case of description, the following examples are described with respect to three groups of blocks (i.e., three fusion candidates). Moreover, there may be two different ways determine the weights applied to the blocks used for fusing (e.g., template matching cost or MSE).

The fusion candidate (e.g., different groups of blocks) may be arranged in a fusion candidate list, also called list of groups of blocks or list of candidate modes. For instance, the list of groups of blocks (e.g., fusion candidate list) may include the first group (e.g., first fusion candidate), the second group (e.g., second fusion candidate), and the third group (e.g., third fusion candidate). Video encoder 200 may signal and video decoder 300 may receive a syntax element (e.g., intra_tmp_fusion_idx) that identifies a location in the list of groups of blocks, from which video decoder 300 may select which group of blocks to use for fusing. Also, video encoder 200 may signal and video decoder 300 may receive a syntax element (e.g., intra_tmp_fusion_weight_type) that indicates the manner which to determine the weights applied to the blocks of the selected group of blocks.

However, this disclosure further recognizes that the fusion candidate (e.g., group of blocks) may instead be inferred (e.g., selected based on inferring rather than signaling), or fusion candidates may be reordered in the fusion candidate list, according to previously decoded data (e.g., the list of groups of blocks may be reordered so that more likely groups of blocks are identified in the list of groups of blocks at lower index values). Therefore, per the techniques of this disclosure, video encoder 200 and video decoder 300 may avoid signaling the weight derivation method and/or index of the fusion candidate, which may thereby decrease bitrate of a corresponding bitstream.

For example, to avoid the signalling of the syntax and candidate index mentioned above, and to improve the coding efficiency of template matching, a decoder side mode decision method may be used by video decoder 300. In this proposed decoder side mode decision method, both video encoder 200 and video decoder 300 may perform a probing scheme to select a best candidate or a best mode. That is video encoder 200 and video decoder 30 may perform the probing scheme to select the best group of blocks from a plurality of groups of blocks. Additionally or alternatively, this probing scheme may also be also applied to sort a candidate list (e.g., order the list of groups of blocks, also called fusion candidate list or list of candidate modes).

The various techniques of this disclosure may be applied to a variety of different template matching contexts and techniques. For example, these techniques may be applied to intra template matching, inter template matching, adaptive reordering of merge candidates with template matching (ARMC-TM), or IBC template matching. These techniques may be used alone or in any combination.

Figure 13:
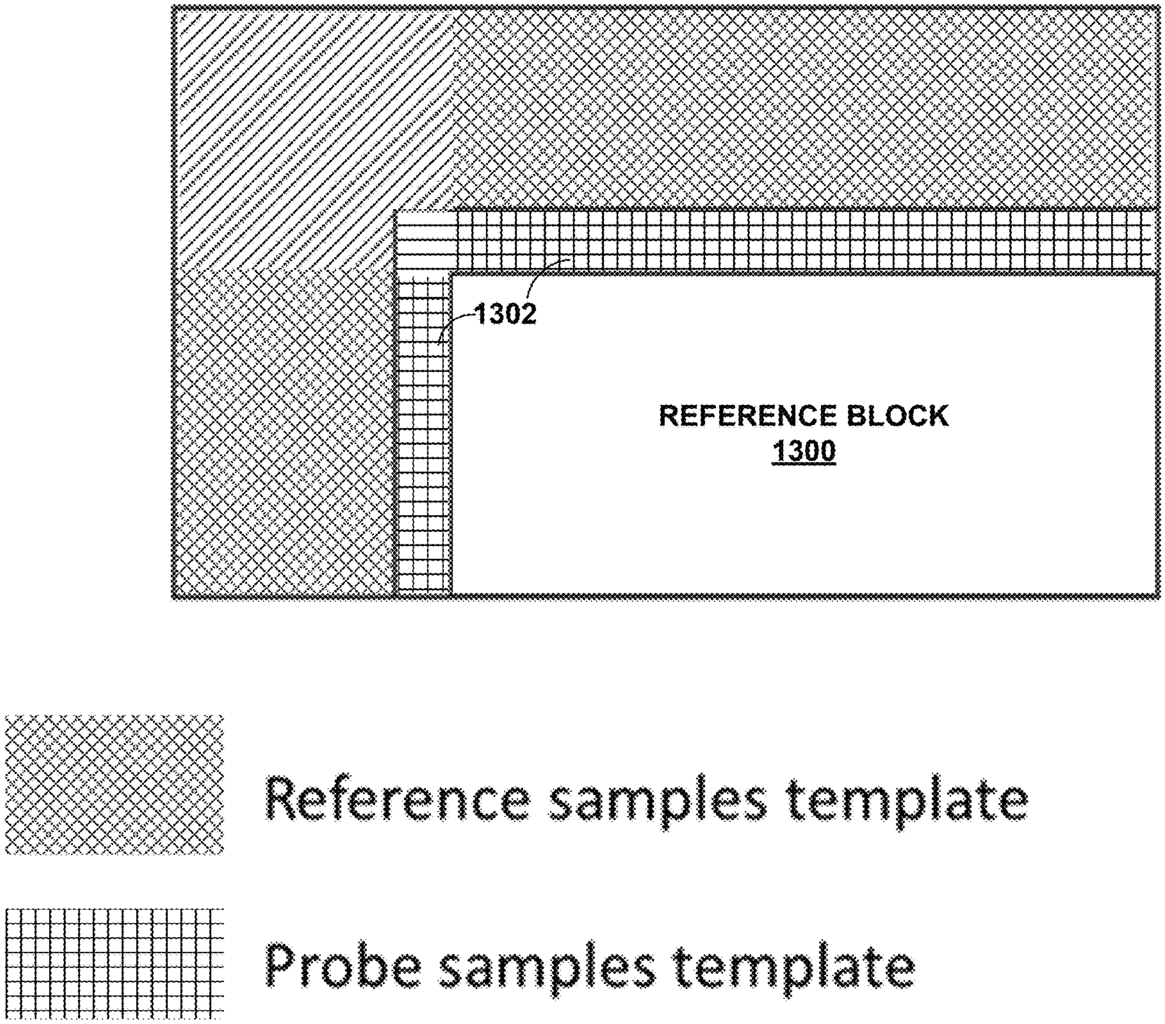
FIG. 13 is a conceptual diagram illustrating an example reference sample template and an example probe sample template according to techniques of this disclosure.

FIG. 13 is a conceptual diagram illustrating an example reference sample template and an example probe sample template according to techniques of this disclosure. In one example, the probing scheme discussed above may include probing pixels from a template to calculate the distortion or cost between the template of a reference block and the template of current coding block. The distortion or cost can be derived as the sum of absolute differences (SAD) or the sum of squares error (SSE) between the pixels in the template of a reference block and the pixels in the template of the current coding block. The distortion or cost can also be derived as the difference between a neighboring area of the reference block and a neighboring area of the current coding block.

In general, video encoder 200 and video decoder 300 may select a group of blocks based on probing samples determined from pixels that are proximate to blocks in the group of blocks and current probing samples determined from pixels that are proximate to the current block. The following describes examples in which fusing of probing sample determined from pixels that are proximate to blocks in the group of blocks is used. However, the example techniques are not so limited. That is fusing of the probing samples for the blocks in the group of blocks is not necessary in all examples, and the example techniques may be applicable where such fusing is not performed.

In some examples, as shown in FIG. 13, pixels adjacent to a reference block 1300 are used as probing samples. That is probing samples 1302 adjacent to reference block 1300 are used as the probe samples template.

For example, as described above, each of the fusion candidates (e.g., group of blocks) includes a plurality of blocks. One of the plurality of blocks, within a group of blocks, is reference block 1300. In some examples, video encoder 200 and video decoder 300 may each determine pixels that are proximate to reference block 1300 to determine probing samples. In the example of FIG. 13, probing samples 1302 are the same as the pixels proximate to reference block 1300, but the techniques are not so limited, and filtering of pixels, such as using filters 11A or 11B, may be used to generate the probing samples 1302.

Video encoder 200 and video decoder 300 may determine probing samples, similar to probing samples 1302 of reference block 1300, for other blocks in a group of blocks. Video encoder 200 and video decoder 300 may fuse (e.g., weighted average or some other technique) the respective probing samples of the group of blocks to generate fused probing samples. Video encoder 200 and video decoder 300 may repeat these operations for other groups of blocks.

For example, video encoder 200 and video decoder 300 may determine first reference probing samples for respective blocks (e.g., reference blocks like reference block 1300) in a first group of blocks, and fuse the first reference probing samples to generate first fused probing samples. Video encoder 200 and video decoder 300 may determine second reference probing samples for respective blocks (e.g., reference blocks like reference block 1300) in a second group of blocks, and fuse the second reference probing samples to generate second fused probing samples.

Although FIG. 13 illustrates reference block 1300 and reference probing samples 1302, video encoder 200 and video decoder 300 may similarly determine probing samples for a current block. For example, video encoder 200 and video decoder 300 may determine current probing samples for the current block based on pixels that are approximate to the current block.

In FIG. 13, the probing samples determined from the pixels that are proximate to the blocks in the group of blocks include probing samples determined from pixels that are immediately adjacent to the blocks in the group of blocks. As an example, the pixels that are immediately adjacent to the blocks in the group of blocks include a first line of pixels having a y-coordinate that is one less than a y-coordinate of a top line of the group of blocks, or (e.g., and/or) a second line of pixels having a x-coordinate that is one less than a x-coordinate of a left column of the group of blocks. For example, as illustrated in FIG. 13, probing samples 1302 are determined from pixels that are immediately above reference block 1300 and from pixels that are immediately to the left of reference block 1300.

Determining probing samples from pixels that are immediately above or left of a block is one example. As described in more detail, in some examples, the probing samples may be determined from pixels further away or based on pixels immediately adjacent and further away from a reference block.

In one or more examples, video encoder 200 and video decoder 300 may compare the current probing samples to the respective fused probing samples of each group of blocks (e.g., of each fusion candidate in the fusion candidate list) to generate respective comparison values. One example way to perform the comparison is to determine respective SAD or SSE values. For instance, video encoder 200 and video decoder 300 may compare the current probing samples to the first fused probing samples to generate a first comparison value, and compare the current probing samples to the second fused probing samples to generate a second comparison value.

Video encoder 200 and video decoder 300 may select a group of blocks (e.g., select a fusion candidate) based on at least the first comparison value and the second comparison value. For example, video encoder 200 and video decoder 300 may select the first group of blocks based on the first comparison value being less than the second comparison value. That is video encoder 200 and video decoder 300 may select the group of blocks having the lowest comparison value (e.g., indicating that fused probing samples of the selected group of blocks is most approximate to the probing samples of the current block).

As another example, video encoder 200 and video decoder 300 may order a list of groups of blocks (e.g., order the fusion candidate list or order the list of candidate modes). For example, video encoder 200 and video decoder 300 may identify the first group of blocks at a lower index value, in the list of groups of blocks, than the second group of blocks based on the first comparison value being less than the second comparison value. Video decoder 300 may select the group of blocks, used for fusing, based on the list of groups of blocks, such as by receiving an index value that identifies the group of blocks that is to be used for fusing.

In some examples, the reference samples are used to derive weights for each fusion candidate, and the probing samples are used to select a best fusion candidate among a fusion candidate list. That is the way in which to determine the weights that are applied to each of the blocks in a group of blocks for purposes of fusing may be based on the reference samples, such as those illustrated in FIG. 13. However, to the select the group of blocks (e.g., best fusion candidate), video encoder 200 and video decoder 300 may use the probing samples.

In some examples, the probing samples are excluded from the reference samples. In some examples, the reference samples contain part of the probing samples or all of the probing samples.

In some examples, the probing scheme is applied to sort/reorder the fusion candidate list. After that, a value for a syntax element is signaled into the bitstream to indicate the index of the final selected candidate from the reordered fusion candidate list.

For example, video encoder 200 and video decoder 300 may have an initial list of groups of blocks (e.g., initial fusion candidate list). This initial list of groups of blocks may be predefined or may be generated using similar techniques by video encoder 200 and video decoder 300 (e.g., based on template matching). Video encoder 200 and video decoder 300 may generate respective fused probing samples for each of the groups of blocks (e.g., first fused probing samples for a first group of blocks, second fused probing samples for a second group of blocks, and so forth). Video encoder 200 and video decoder 300 may determine respective comparison values based on a comparison (e.g., using SAD or SSE) of the current probing samples and each of the respective fused probing samples. Video encoder 200 and video decoder 300 may reorder the initial list of groups of blocks based on the respective comparison values (e.g., groups of blocks having fused probing samples that are similar to current probing samples are assigned smaller index values in the list of groups of blocks, and groups of blocks having fusing probing samples that are less similar to the current probing samples are assigned larger index values in the list of groups of blocks).

In some examples, the fusion candidate list may contain any or all of the following fusion candidates the fusion candidate using template matching cost to derive the fusion weights, the fusion candidate using MSE minimization to derive the fusion weights, the fusion candidate including the location information in the filtering process, the fusion candidate including the spatial pixel in the filtering process, or the fusion candidate including the gradient which is derived from current pixel, and/or spatial pixel(s) in the filtering process.

In some examples, the fusion candidate fuses N candidates within one coding mode (ex: two BVs in intraTMP, two MVs in Merge, . . . ). In some examples, N candidates may be fused across coding modes (ex: M BV modes from intraTMP, and N-M BV modes from intraIBC). In some case, some candidates for fusion may come from neighboring block information (BVs, MVs, etc.) or temporal block information (BVs, MVs, etc.)

In some examples, when constructing the fusion candidate list to process the probing scheme, some conditions may be checked for each or some of the fusion candidates. If these conditions are not satisfied for a candidate, the candidate may be removed from the fusion candidate list and not present in the probing scheme.

In some examples, if the ratio of the minimum template cost among all block vector (BV) candidates for the current block and the minimum template cost among all the BV candidates in the fusion candidate is larger than a threshold, the fusion candidate may be removed from the fusion candidate list.

In some examples, the location information contains at least one of the following: the horizontal position, the vertical position, the horizontal position times the vertical position. In some examples, the location is relative to the upper-left position of current coding block. In some examples, the location is related to the upper-left position of the template.

Figure 14:
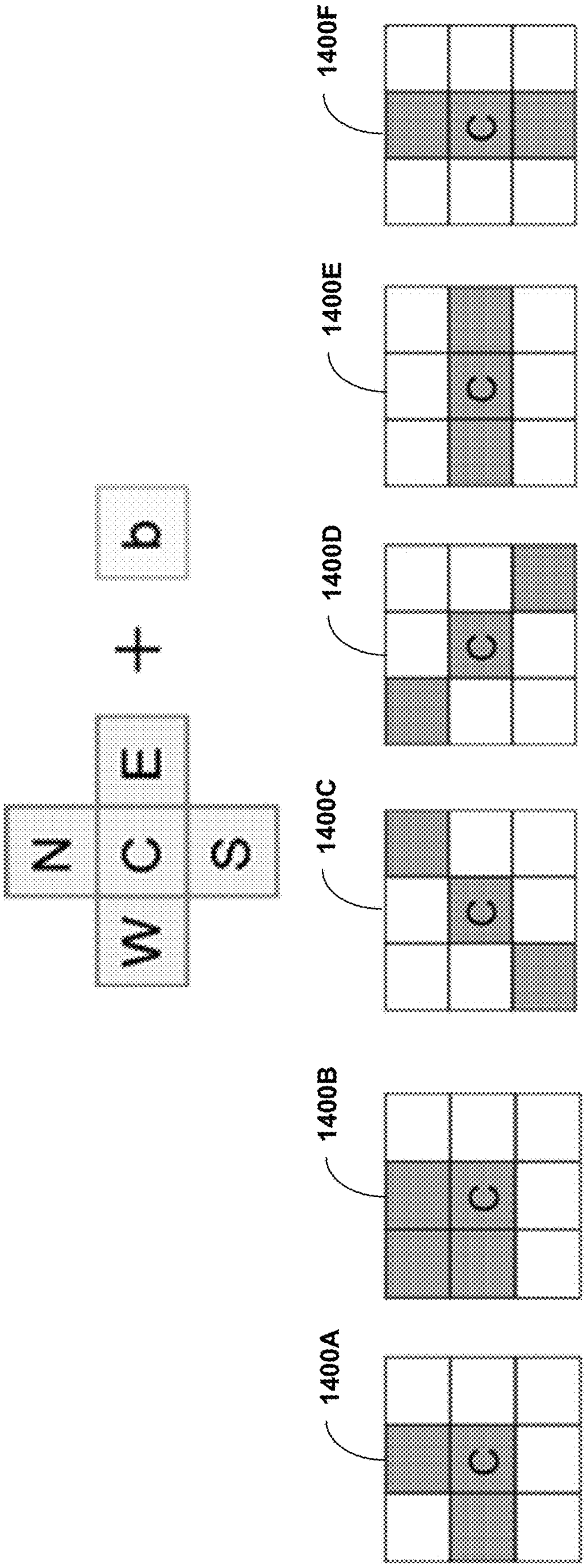
FIG. 14 is a conceptual diagram illustrating an example of a spatial pixel relative to a current pixel.

FIG. 14 is a conceptual diagram illustrating an example of a spatial pixel relative to a current pixel. In some examples, the location information discussed above may indicate a spatial pixel and at least one of the following: left (W), right (E), above (N), or below(S) the spatial pixel, as shown in FIG. 14.

For example, FIG. 14 illustrates samples 1400A-1400F. In one or more examples, when fusing probing samples from different groups of blocks, video encoder 200 and video decoder 300 may fuse together corresponding pixels in each of the groups of blocks identified by "C" in samples 1400A-1400F, and further fuse together corresponding pixels in each of the groups of blocks (including pixels that may neighbor the groups of blocks) identified by gray shading in samples 1400A-1400F. In some examples, video encoder 200 and video decoder 300 may utilize similar techniques as part of the fusing of the blocks in the selected group of blocks.

Various techniques may be used to signal data for a probing scheme. In some examples, the candidate list (e.g., list of groups of blocks) contains M candidates {M}, the probing scheme is applied to select a best candidate (e.g., select best group of blocks) based on the cost or distortion derived from the probing samples without sending any candidate index into the bitstream. For example, cost or distortion may be based on the fused probing samples for each of the groups of blocks and the probing sample of the current block.

In some examples, the candidate list contains M candidates {M}, the probing scheme is applied to sort or reorder the candidate list based on the cost or distortion derived from the probing sample. For instance, video encoder 200 and video decoder 300 may reorder based on comparison between fused probing samples and probing samples of current block. Video encoder 200 selects a final candidate and signals the candidate index from the reordering candidate list to the bitstream. Video decoder 300 may therefore determine the candidate from the candidate index.

In some examples, the candidate list contains M candidates {M}, the probing scheme is applied to select a best candidate based on the cost or distortion derived from the probing samples. Video encoder 200 first signals a flag to indicate whether the best candidate selected by the probing scheme is determined as the final candidate; if the best candidate selected by the probing scheme is not chosen as the final candidate, video encoder 200 further signals the candidate index from the candidate list as the final candidate. Thus, video decoder 300 may determine a value of the first flag and, using the value for the first flag, determine whether the best candidate is the final candidate. If so, video decoder 300 may use the best candidate. Otherwise, video decoder 300 may determine that the candidate index value will be signaled, so video decoder 300 may decode the candidate index and use the candidate indicated by the candidate index.

In some examples, the candidate list contains M candidates {M}, the probing scheme is applied to select a best candidate based on the cost or distortion derived from the probing samples. Video encoder 200 may first signal a flag to indicate whether the best candidate selected by the probing scheme is determined as the final candidate; if the best candidate selected by the probing scheme is not chosen as the final candidate, video encoder 200 may further signal the candidate index from the updated candidate list, which excludes the candidate selected by the probing scheme as the final candidate. Thus, video decoder 300 may determine a value of the first flag and, using the value for the first flag, determine whether the best candidate is the final candidate. If so, video decoder 300 may use the best candidate. Otherwise, video decoder 300 may determine that the candidate index value will be signaled, so video decoder 300 may decode the candidate index and use the candidate indicated by the candidate index, although the set of remaining candidate indexes excludes an index for the best candidate.

In some examples, the candidate list contains M+N candidates {M+N}, the probing scheme is applied to select a best candidate from {M+N} based on the cost or distortion derived from the probing samples. Video encoder 200 first signals a flag to indicate whether the best candidate selected by the probing scheme is determined as the final candidate; if the best candidate selected by the probing scheme is not chosen as the final candidate, video encoder 200 further signals the candidate index from the candidate list {M} as the final candidate. Thus, video decoder 300 may determine a value of the first flag and, using the value for the first flag, determine whether the best candidate is the final candidate. If so, video decoder 300 may use the best candidate. Otherwise, video decoder 300 may determine that the candidate index value will be signaled, so video decoder 300 may decode the candidate index and use the candidate indicated by the candidate index corresponding to one of the M candidates.

Furthermore, when the best candidate selected by the probing scheme belongs to the candidate set {M}, video encoder 200 may first signal a flag to indicate whether the best candidate selected by the probing scheme is determined as the final candidate; if the best candidate selected by the probing scheme is not chosen as the final candidate, the encoder further signals the candidate index from the updated candidate list {M} which excludes the candidate selected by the probing scheme and replace it by another candidate in the candidate set {N} as the final candidate.

In some examples, the updated candidate list {M} excluding the candidate selected by the probing scheme that replaces it by the best candidate in the candidate set {N} with the minimal cost derived using probing samples.

In some examples, the updated candidate list {M}' contains the 2nd best, 3rd best, . . . , (M+1) best candidates according to the probing cost. Video encoder 200 first signals a flag to indicate whether the best candidate selected by the probing scheme is determined as the final candidate; if the best candidate selected by the probing scheme is not chosen as the final candidate, video encoder 200 further signals the candidate index from the updated candidate list {M}'.

In some examples, video encoder 200 may signal a flag into the bitstream to indicate whether the proposed probing scheme is applied.

In some examples, when the best candidate selected by the probing scheme belongs to the candidate set {M}, video encoder 200 first signals a flag to indicate whether the best candidate selected by the probing scheme is determined as the final candidate; if the best candidate selected by the probing scheme is not chosen as the final candidate, video encoder 200 further signals the candidate index from a pre-defined candidate list.

Once the candidate is derived from the list, the fusion method for this candidate is decided by template cost, which means that the fusion method is applied on the template to get the fused template, then the template cost for each fusion method is calculated. The final fusion method which has the minimum template cost is then selected That is as described above, the fusion method may be applied to the reference template and the reference template includes the probing samples. Therefore, as described above, video encoder 200 and video decoder 300 may perform fusing on probing samples of the groups of blocks to generate respective fused probing samples that are compared to current probing samples to select the group of blocks that are used for fusing.

Figure 15:
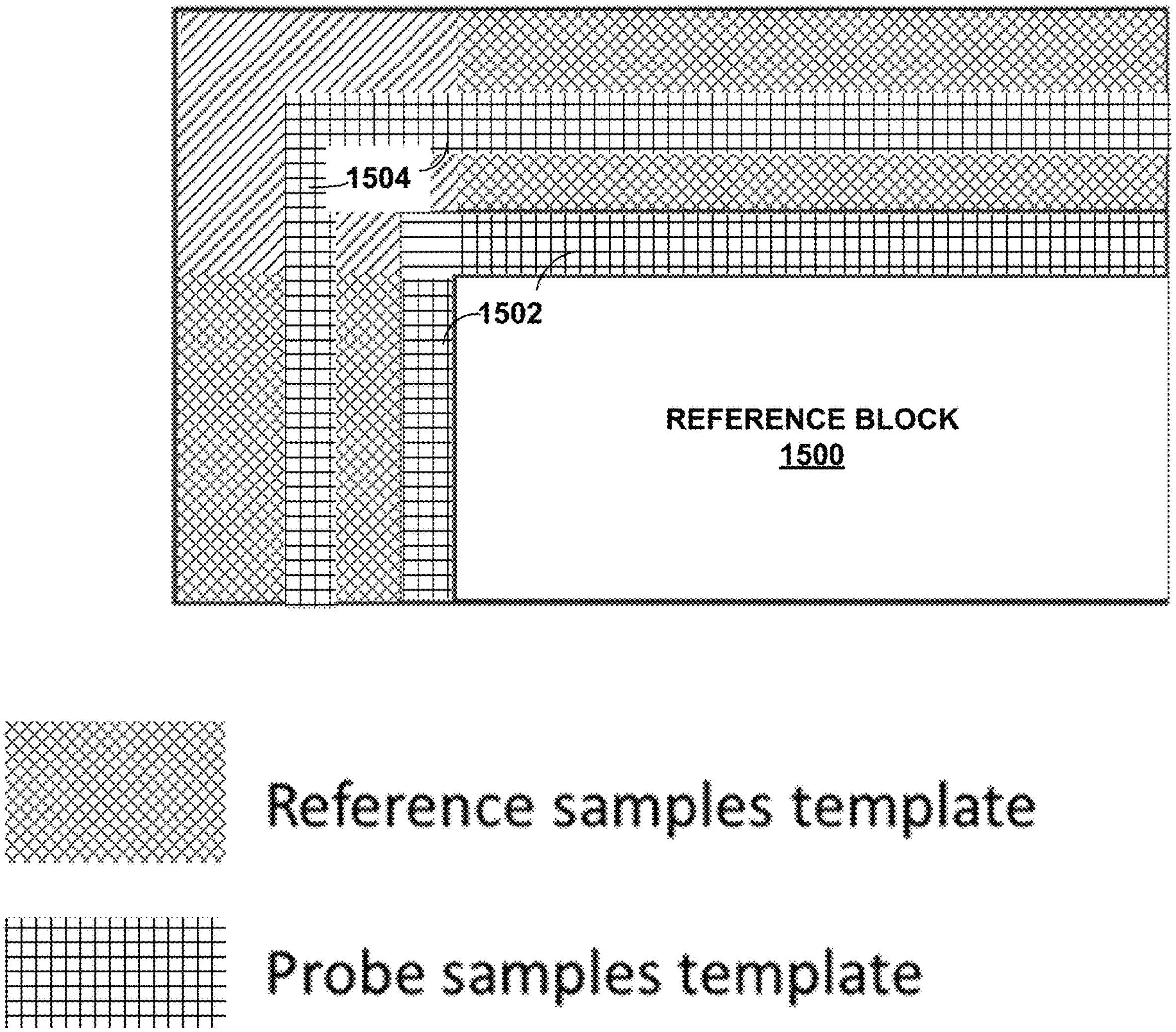
FIG. 15 is a conceptual diagram illustrating an example reference sample template and an example multi-lined probe sample template according to techniques of this disclosure.

FIG. 15 is a conceptual diagram illustrating an example reference sample template and an example multi-lined probe sample template according to techniques of this disclosure. In some examples, a probing scheme contains more than one probing line. Video encoder 200 may signal a flag to indicate which probing line is used to calculate the probing cost.

In some examples, as shown in FIG. 15, pixels that are not immediately adjacent to a reference block 1500 are used as probing samples. That is in addition to using probing samples 1502 that are determined from immediately adjacent pixels to reference block 1500, video encoder 200 and video decoder 300 may determine probing samples 1504 based on pixels that are not immediately adjacent to reference block 1500.

For example, as described above, each of the fusion candidates (e.g., group of blocks) includes a plurality of blocks. One of the plurality of blocks, within a group of blocks, is reference block 1500. In some examples, video encoder 200 and video decoder 300 may each determine pixels that are proximate to reference block 1300 to determine probing samples. In the example of FIG. 15, probing samples 1502 are the same as the pixels proximate to reference block 1500, but the techniques are not so limited, and filtering of pixels, such as using filters 11A or 11B, may be used to generate the probing samples 1502. Probing samples 1504 are the same as the pixels proximate but further away from reference block 1500, but the techniques are not so limited, and filtering of pixels, such as using filters 11A or 11B, may be used to generate the probing samples 1504.

Video encoder 200 and video decoder 300 may determine probing samples, similar to probing samples 1502 and 1504 of reference block 1500, for other blocks in a group of blocks. Video encoder 200 and video decoder 300 may fuse (e.g., weighted average or some other technique) the respective probing samples of the group of blocks to generate fused probing samples. Video encoder 200 and video decoder 300 may repeat these operations for other groups of blocks.

For example, video encoder 200 and video decoder 300 may determine first reference probing samples for respective blocks (e.g., reference blocks like reference block 1500) in a first group of blocks, and fuse the first reference probing samples to generate first fused probing samples. Video encoder 200 and video decoder 300 may determine second reference probing samples for respective blocks (e.g., reference blocks like reference block 1500) in a second group of blocks, and fuse the second reference probing samples to generate second fused probing samples.

Although FIG. 15 illustrates reference block 1500 and reference probing samples 1502 and 1504, video encoder 200 and video decoder 300 may similarly determine probing samples for a current block. For example, video encoder 200 and video decoder 300 may determine current probing samples for the current block based on pixels that are approximate to the current block.

In FIG. 15, the probing samples determined from the pixels that are proximate to the blocks in the group of blocks include probing samples determined from pixels that are not immediately adjacent to the blocks in the group of blocks. For example, in FIG. 15, for probing samples 1504, the pixels that are not immediately adjacent to the blocks in the group of blocks include a first line of pixels having a y-coordinate that is two or more less than a y-coordinate of a top line of the group of blocks (e.g., multiple lines above reference block 1500), or (e.g., and/or) a second line of pixels having a x-coordinate that is two or more less than a x-coordinate of a left column of the group of blocks (e.g., multiple columns left of reference block 1500).

In some examples, when a probing line is selected the pixels in the probing line are excluded from the reference samples template. In some examples, the proposed probing scheme contains the 2nd and the 4th line in the template as the probing line. Video encoder 200 may signal a flag to indicate which probing line is used, as shown in FIG. 15.

In some examples, the proposed probing scheme contains 3rd and 4th line in the template as the probing line. Video encoder 200 may signal a flag to indicate which probing line is used.

In some examples, the proposed probing scheme contains an above probing line and a left probing line. Video encoder 200 may signal a flag to indicate whether the above or left probing line is used to calculate the probing cost. In some examples, video encoder 200 may signal a flag into the bitstreams to indicate whether the techniques related to multiple probing lines are applied.

In some examples, weights in a fusion filter are modified by adding a delta value (the delta value could be a positive or a negative value), the probing scheme is applied to calculate the cost after weights adjustment. If the probing cost after weights adjustment is less than the probing cost without weights adjustment, the weights in the fusion filter are updated by the weights after adjustment.

In some examples, the probing scheme tests different delta value from −D to +D on a first coefficient in the fusion filter and select the best coefficient with minimum probing cost. In some examples, if the weights are derived using the template matching cost, when a delta value is added on a first coefficient, one of remaining coefficient is subtracted by the delta value. In some examples, if the weights are derived by MSE minimization, when a delta value is added on a first coefficient, the bias term is subtracted by (delta*pixel value) or (delta*value/(the maximum value/2)).

In the example above, the pixel value may be the mean value of the template, the value of a predefined pixel in the template, or a predefined value such as the maximum value divided by 2. In some examples, after the best coefficient is determined, the probing scheme further test different delta value from −D' to +D' on a second coefficient and the select a best second coefficient having the minimum probing cost. In some examples, a flag is signaled into the bitstream to indicate whether the proposed weights adjustment is applied.

Figure 16:
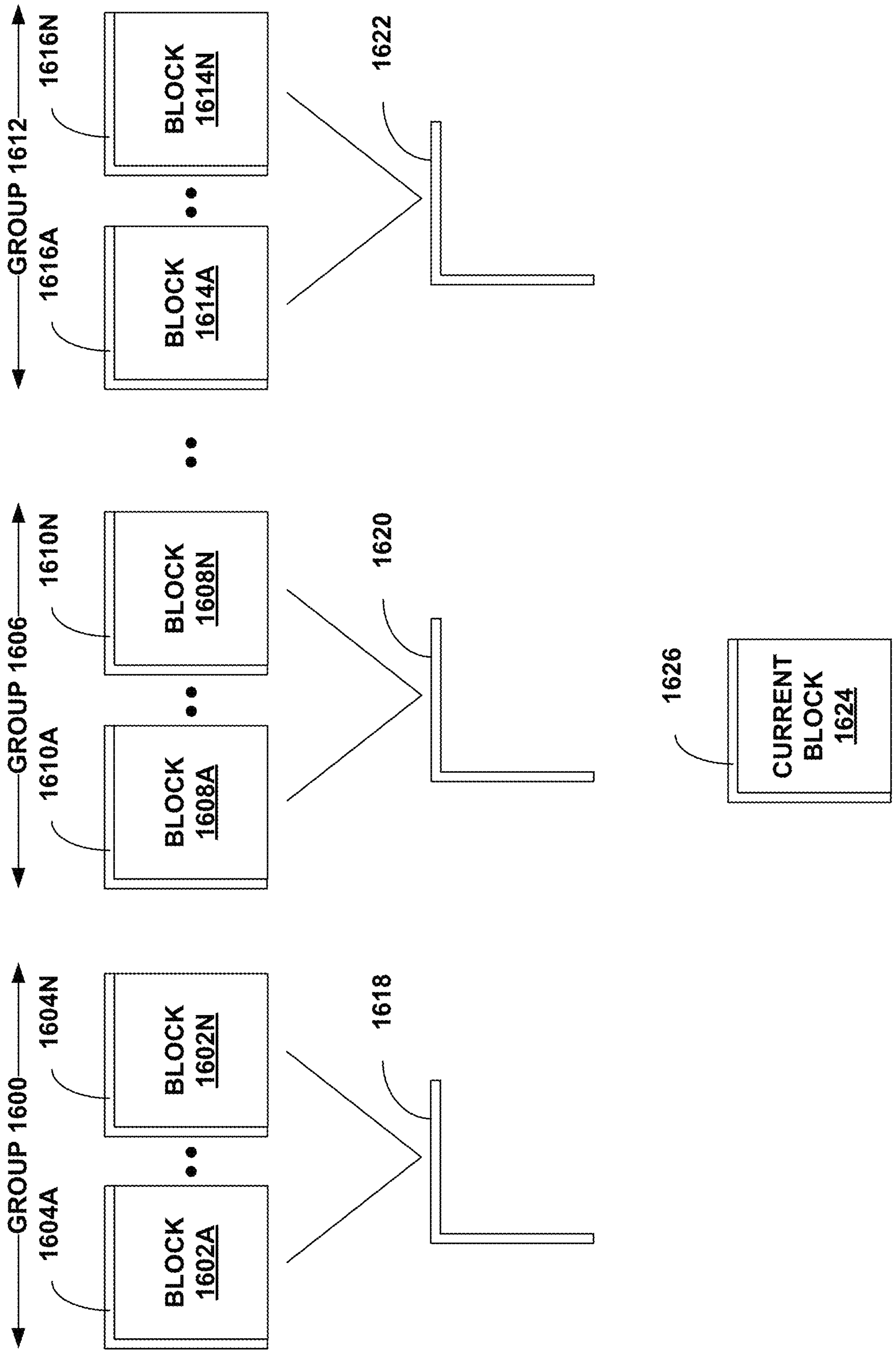
FIG. 16 is a conceptual diagram illustrating an example of determining a group of blocks for fusion.

FIG. 16 is a conceptual diagram illustrating an example of determining a group of blocks for fusion. FIG. 16 illustrates group 1600 that includes blocks 1602A-1602N, group 1606 that includes blocks 1608A-1608N, and group 1612 that includes blocks 1614A-1614N. There may be more or fewer groups than groups 1600, 1606, and 1612, and there may be more or fewer blocks in each group, and each group may include different or same number of blocks.

Video encoder 200 and video decoder 300 may determine probing samples 1604A-1604N from pixels that proximate to blocks 1602A-1602N in group 1600. Video encoder 200 and video decoder 300 may determine probing samples 1610A-1610N from pixels that proximate to blocks 1608A-1608N in group 1606. Video encoder 200 and video decoder 300 may determine probing samples 1616A-1616N from pixels that proximate to blocks 1614A-1614N in group 1612.

For example, for each of groups, the probing samples determined from the pixels that are proximate to the blocks in the group of blocks include probing samples determined from pixels that are immediately adjacent to the blocks in the group of blocks. As an example, the pixels that are immediately adjacent to the blocks in the group of blocks comprises a first line of pixels having a y-coordinate that is one less than a y-coordinate of a top line of the group of blocks, or (e.g., and/or) a second line of pixels having a x-coordinate that is one less than a x-coordinate of a left column of the group of blocks.

As another example, the probing samples determined from the pixels that are proximate to the blocks in the group of blocks include probing samples determined from pixels that are not immediately adjacent to the blocks in the group of blocks. For instance, the pixels that are not immediately adjacent to the blocks in the group of blocks include a first line of pixels having a y-coordinate that is two or more less than a y-coordinate of a top line of the group of blocks, or (e.g., and/or) a second line of pixels having a x-coordinate that is two or more less than a x-coordinate of a left column of the group of blocks.

Video encoder 200 and video decoder 300 may fuse probing samples 1604A-1604N (e.g., weighted average or some other techniques) to generate first fused probing samples 1618. Similarly, video encoder 200 and video decoder 300 may fuse probing samples 1610A-1610N (e.g., weighted average or some other techniques) to generate second fused probing samples 1620, and fuse probing samples 1616A-1616N (e.g., weighted average or some other techniques) to generate third fused probing samples 1622.

As illustrated in FIG. 16, video encoder 200 and video decoder 300 may determine probing samples 1626 for current block 1624 form pixels proximate to current block 1624. Video encoder 200 and video decoder 300 may compare the current probing samples 1626 to the first fused probing samples 1618 to generate a first comparison value (e.g., using SAD or SSE), compare the current probing samples 1626 to the second fused probing samples 1620 to generate a second comparison value, and compare the current probing samples 1626 to the third fused probing samples 1622.

Video encoder 200 and video decoder 300 may select a group of blocks based on at least the first comparison value, the second comparison value, and the third comparison value. For example, video encoder 200 and video decoder 300 may determine which one of the first, second, or third comparison values is the least, and select the group of blocks corresponding to the least comparison value of the first, second, or third comparison value.

As another example, video encoder 200 and video decoder 300 may order the list of groups of blocks based on the first, second, or third comparison values. For instance, video encoder 200 and video decoder 300 may include the group of blocks from group 1600, group 1606, and group 1612 corresponding to the least comparison value in index 0 of the list of groups of pixels. Video encoder 200 and video decoder 300 may include the group of blocks from group 1600, group 1606, and group 1612 corresponding to the next least comparison value in index 1 of the list of groups of pixels. For instance, video encoder 200 and video decoder 300 may include the group of blocks from group 1600, group 1606, and group 1612 corresponding to the highest comparison value in index 2 of the list of groups of pixels.

The fusing of probing samples 1604A-1604N, 1610A-1610N, and 1616A-1616N is provided for illustration purposes. Such fusing may not be necessary in all examples, and there may be other ways in which to select which group of blocks is used for fusing. For instance, each one of probing samples 1604A-106N may be compared with probing samples 1626 of current block 1624, and the aggregate of the comparisons (e.g., SAD value) may be stored as the comparison value for group 1600. Video encoder 200 and video decoder 300 may perform similar techniques for probing samples 1610A-1610N and probing samples 1616A-1616N, and determine respective comparison values for group 1606 and group 1612. Based on the comparison values, video encoder 200 and video decoder 300 may select a group of blocks that are used for fusing.

Figure 17:
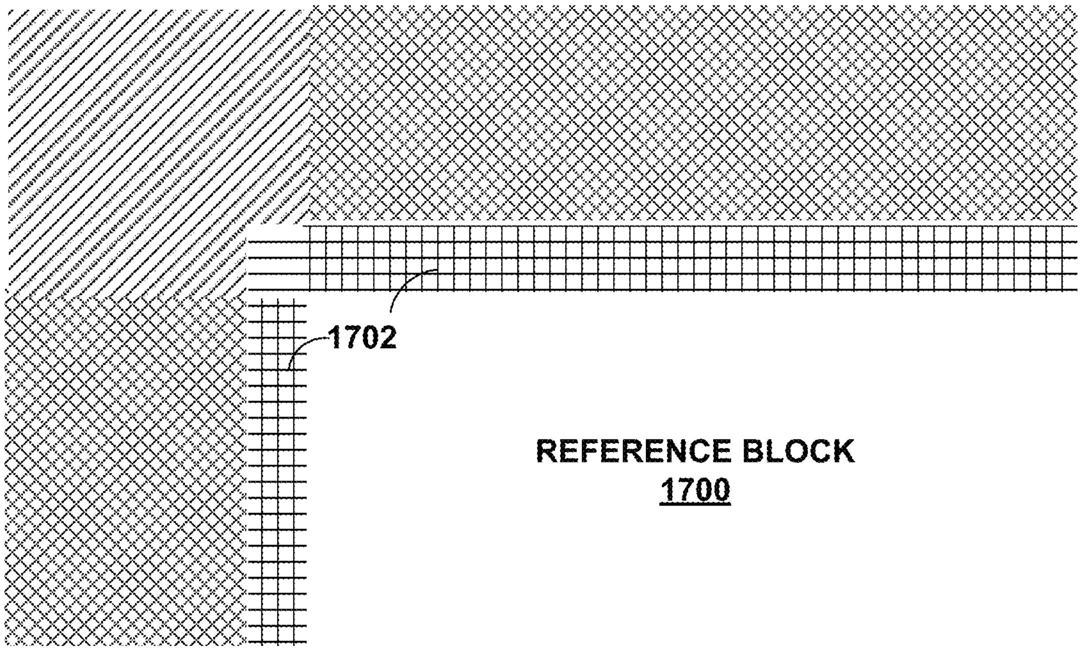
FIG. 17 is a conceptual diagram illustrating an example set of pixels that may be multiplied by a weighting factor according to techniques of this disclosure.

FIG. 17 is a conceptual diagram illustrating an example set of pixels that may be multiplied by a weighting factor according to techniques of this disclosure. In some examples, during the template matching cost calculation, the weights are derived based on the pixel or line position in the template. In some examples, the cost of the line which is adjacent to the current block and similarly adjacent to the reference block 1700 is multiplied by a weighting factor N. That is to determine probing samples 1702, the pixels adjacent to reference block 1700 may be multiplied by N. The value N may be a power of 2 number, a non-negative integer value, or M/N, where N is a power of 2 number. As an example shown in FIG. 17, the cost of the above and left lines (shaded using horizontal and vertical hashing) is multiplied by N.

In some examples, the weighting factor for each line may be derived according to the distance between the line and the boundary of the current block.

Figure 18:
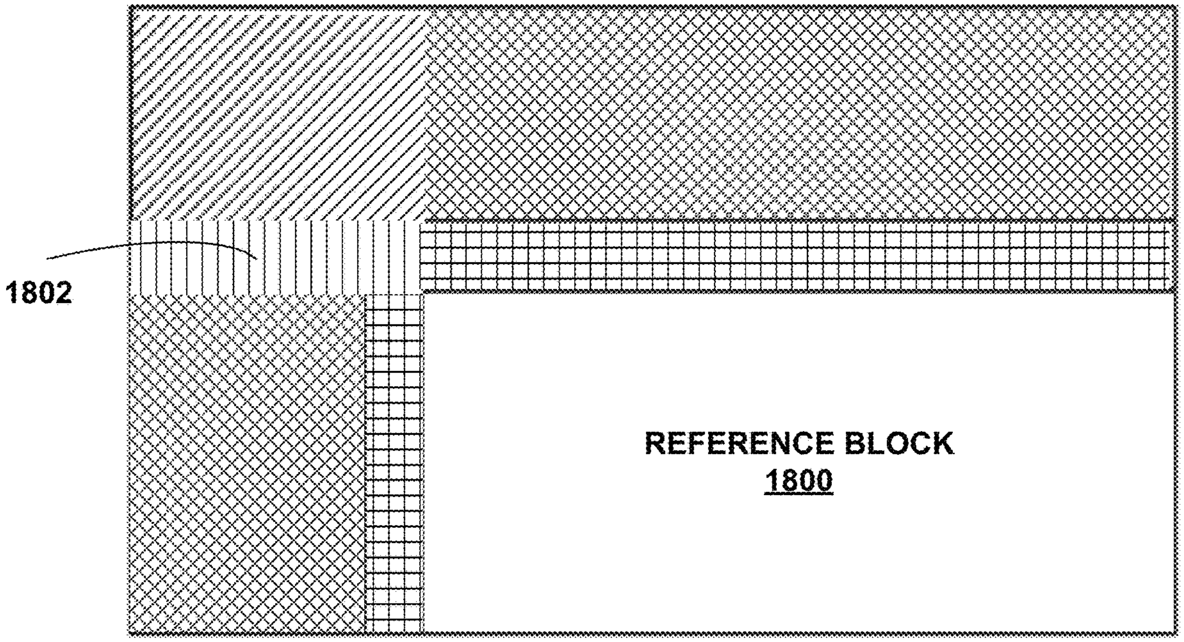
FIG. 18 is a conceptual diagram illustrating another example set of pixels that may be multiplied by a weighting factor according to techniques of this disclosure.

FIG. 18 is a conceptual diagram illustrating another example set of pixels that may be multiplied by a weighting factor according to techniques of this disclosure. In some examples, as shown in FIG. 18, the costs of the pixels shaded using vertical hashing are multiplied by the weighting factor. For instance, FIG. 18 illustrates reference block 1800, and to determine probing samples 1802, video encoder 200 and video decoder 300 may multiply pixels shaded using vertical hashing by a weighting factor.

In some examples, the cost of the line which is selected as the probing line is multiplied by a weighting factor N during the template matching searching. In some examples, only the cost of the above line adjacent to the current coding block is multiplied by the weighting factor. In some examples, only the cost of the left line adjacent to the current coding block is multiplied by the weighting factor. In some examples, a first flag is signaled into the bitstream to indicate whether this proposed cost weighting method is used.

In some examples, a second flag is signaled into the bitstream to indicate the cost of which line is multiplied by the weighting factor. In some examples, the weighting factor is signaled into the bitstream.

Figure 2:
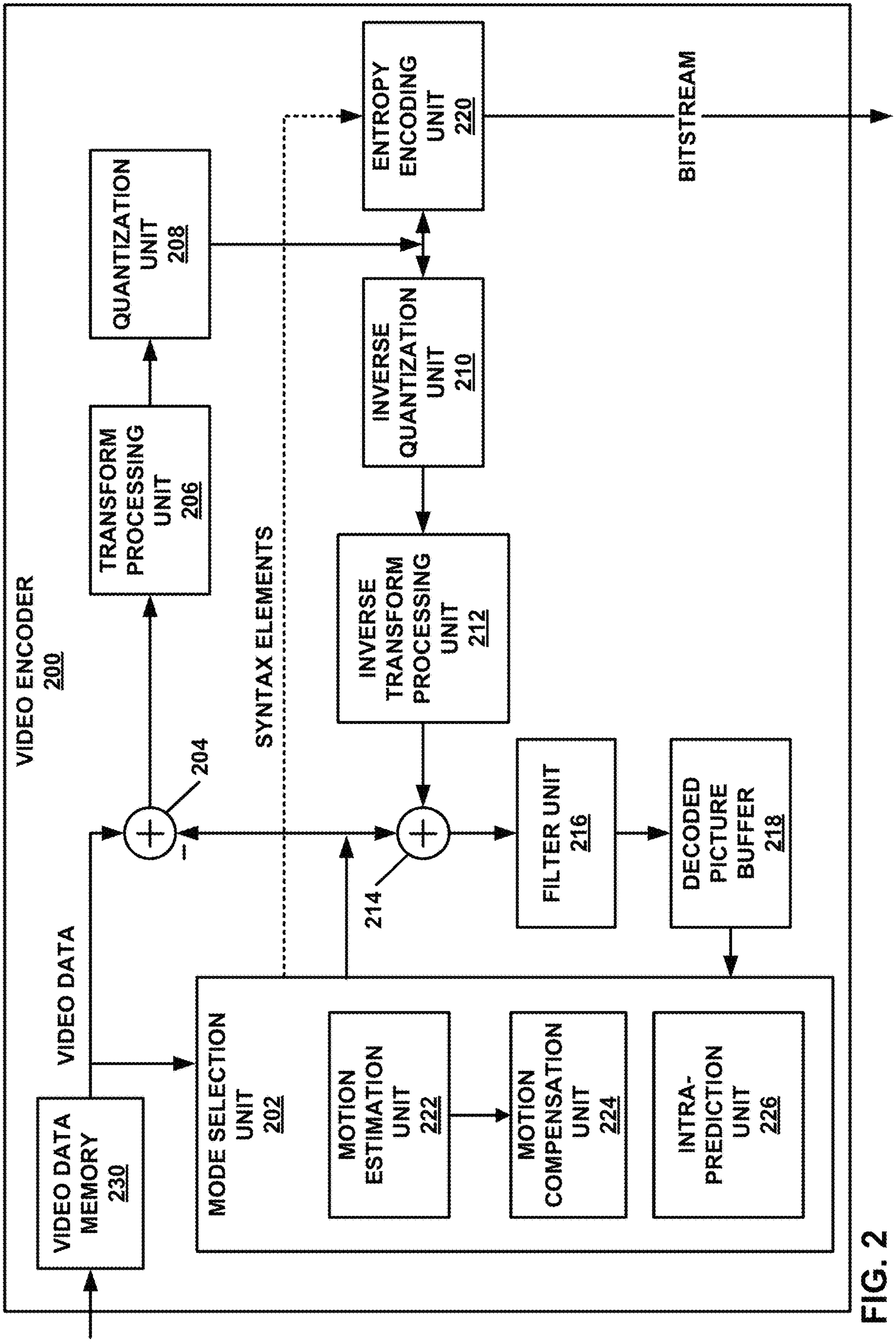
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that template matching is enabled for a current block, perform at least one of fusion of multiple candidates padding, filtering, weighting, or position-dependent fusion as part of template matching, and encode the current block based on template matching.

Figure 3:
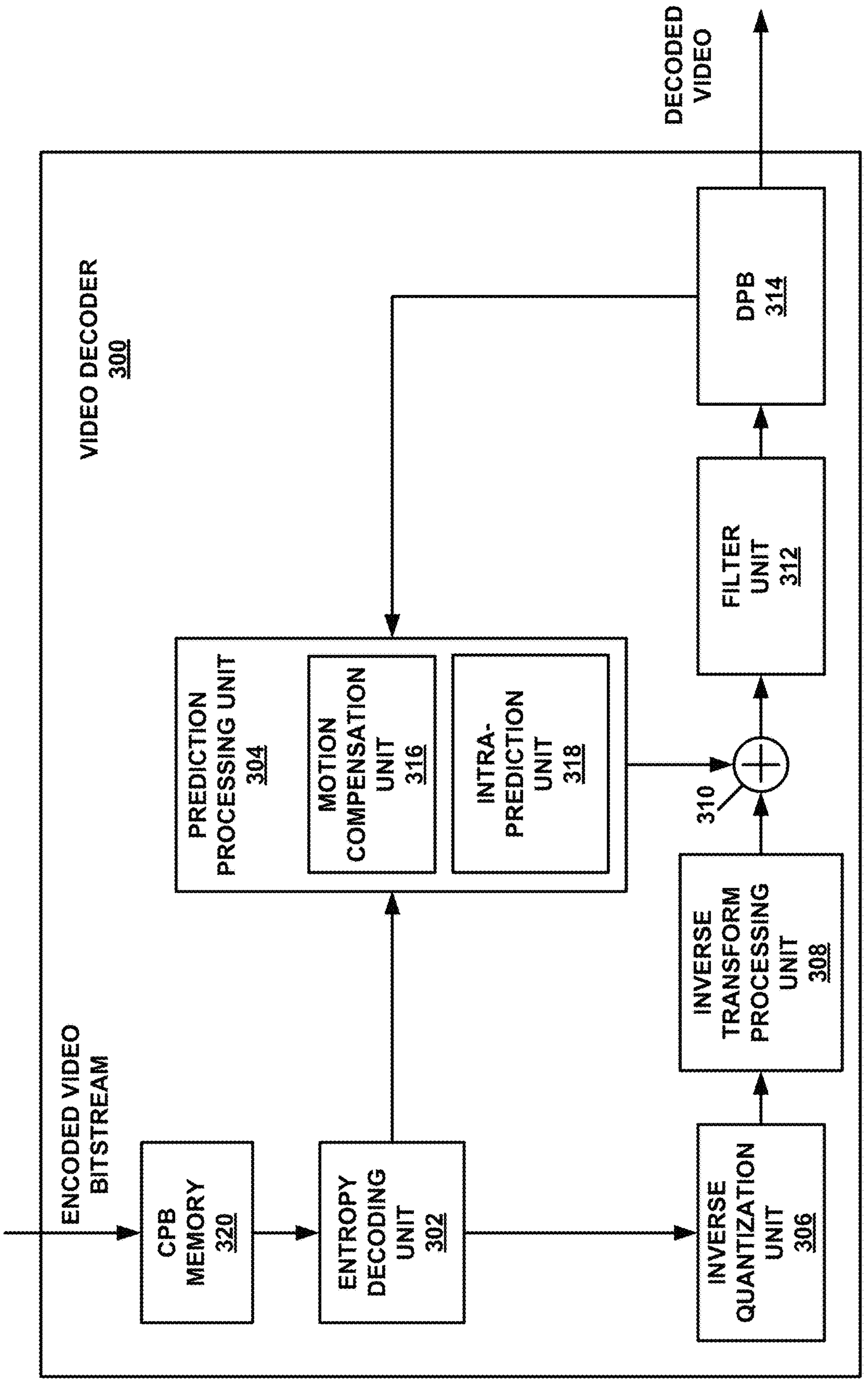
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that template matching is enabled for a current block, perform at least one of fusion of multiple candidates, padding, filtering, weighting, or position-dependent fusion as part of template matching, and decode the current block based on template matching.

Figure 4:
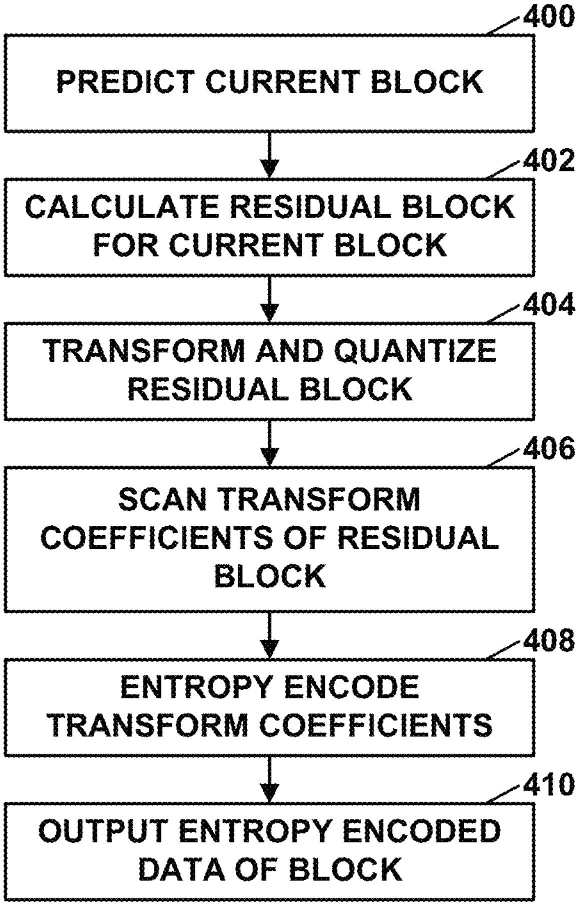
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 5:
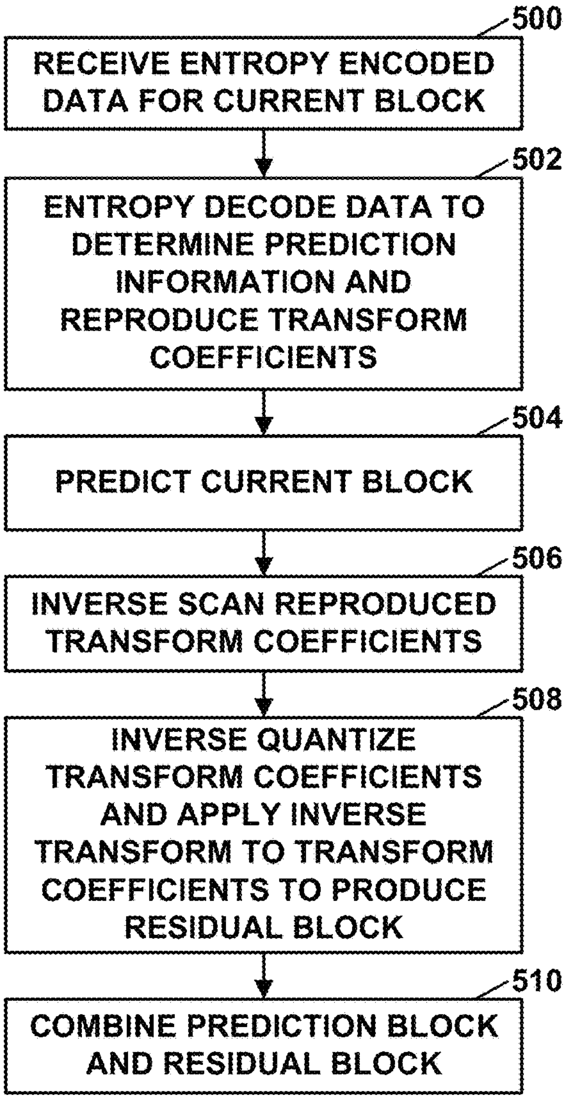
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 19:
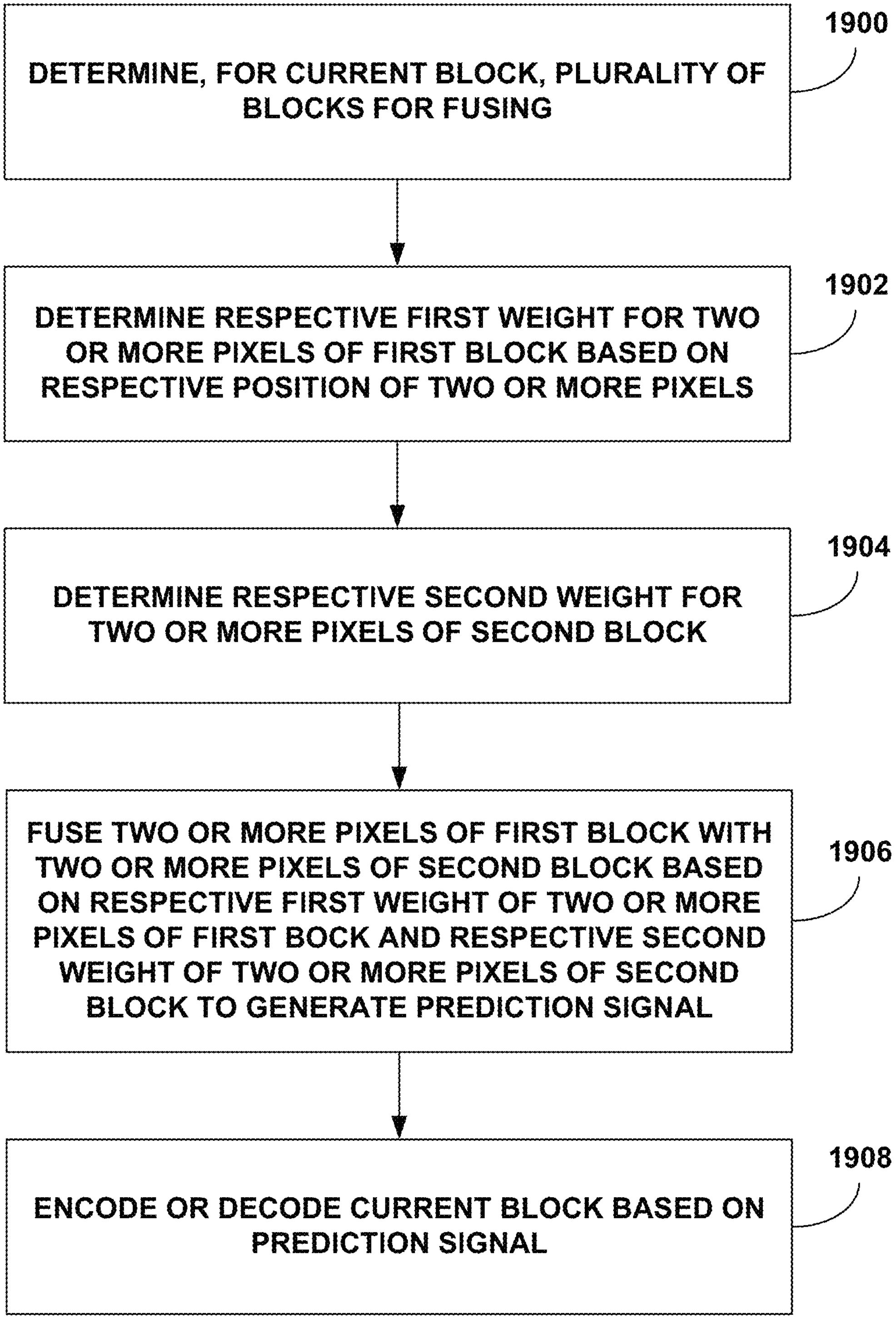
FIG. 19 is a flowchart illustrating an example method of operation.

FIG. 19 is a flowchart illustrating an example method of operation. One or more memories (e.g., memory 106, memory 120, video data memory 230, decoded picture buffer 218, CPB memory 320, DPB 314, or some other memory) may be configured to store the video data. Processing circuitry of video encoder 200 or video decoder 300 may be coupled to the one or memories.

The processing circuitry of video encoder 200 or video decoder 300 may be configured to determine, for a current block, a plurality of blocks for fusing (1900). The blocks for fusing may also be referred to as candidate blocks each having a candidate value. There may be various ways in which to determine the plurality of blocks. For example, the processing circuitry of video encoder 200 or video decoder 300 may compare a current template based on pixels that neighbor the current block to respective reference templates that neighbor respective blocks of a group of blocks (e.g., determine template matching costs), and determine the plurality of blocks for fusing, from the group of blocks, based on the comparison (e.g., based on the template matching costs).

As another example, the processing circuitry of video encoder 200 or video decoder 300 may perform the probing scheme techniques described above, such as with FIG. 16 to determine the plurality of blocks used for fusing. For example, the processing circuitry of video encoder 200 or video decoder 300 may determine probing samples based on pixels that are proximate to the plurality of blocks, fuse the probing samples to generate fused probing samples, and determining the plurality of blocks, from among a plurality of groups of blocks, based on the fused probing samples, as illustrated in FIG. 16 and described elsewhere including with respect to FIG. 21.

In some examples, the processing circuitry of video encoder 200 or video decoder 300 may filter at least one of the current template or the respective reference templates to generate at least one of a filtered current template or respective filtered reference templates. In such examples, to compare (e.g., determine template matching costs), the processing circuitry of video encoder 200 or video decoder 300 may be configured to one of: compare the filtered current template to the respective reference templates, compare the current template to the respective filtered reference templates, or compare the filtered current template to the respective filtered reference templates.

The processing circuitry of video encoder 200 or video decoder 300 may determine a respective first weight for two or more pixels of a first block of the plurality of blocks based on a respective position of the two or more pixels of the first block (1902). For example, a respective first weight for a first pixel of the first block and a respective first weight for a second pixel of the first block is different. That is the weight for two different pixels in the first block is different, and may be based on their respective positions. In some examples, the processing circuitry of video encoder 200 or video decoder 300 may determine the respective first weight for the two or more pixels of the first block based on the respective position of the two or more pixels of the first block and a candidate value of the first block. The candidate value may indicate whether the first block is one of the first 0 to i candidate blocks, or i+1 to N candidate blocks, or whether the first block is candidate 0 or candidate 1 (e.g., where only two blocks are used for fusing).

As one example, the respective position of the two or more pixels of the first block includes a respective x-coordinate and a respective y-coordinate. To determine the respective first weight, the processing circuitry of video encoder 200 or video decoder 300 may be configured to determine a third weight for the first block (e.g., a predefined or signaled weight for the first block). The processing circuitry of video encoder 200 or video decoder 300 may determine a value based on the x-coordinate and a width of the first block (e.g., if first block is candidate 0), or the y-coordinate and a height of the first block (e.g., if first block is candidate 1). The processing circuitry of video encoder 200 or video decoder 300 may determine the respective first weight based on the value and the third weight.

For example, to determine the value, the processing circuitry of video encoder 200 or video decoder 300 may multiply a ratio of the x-coordinate to the width of the first block with the third weight. As another example, to determine the value, the processing circuitry of video encoder 200 or video decoder 300 may multiply a ratio of the y-coordinate to the height of the first block with the third weight.

The processing circuitry of video encoder 200 or video decoder 300 may determine a respective second weight for two or more pixels of a second block of the plurality of blocks (1904). As one example, the processing circuitry of video encoder 200 or video decoder 300 may use similar or identical techniques used to determine the respective first weights of pixels in the first block. For example, to determine the respective second weight, the processing circuitry of video encoder 200 or video decoder 300 may determine the respective second weight for the two or more pixels of the second block of the plurality of blocks based on a respective position of the two or more pixels of the second block. However, in some examples, rather than the pixels of the second block having different weights, to determine the respective second weight, the processing circuitry of video encoder 200 or video decoder 300 may set the respective second weight for all of the two or more pixels of the second block to be the same.

The processing circuitry of video encoder 200 or video decoder 300 may fuse the two or more pixels of the first block and the two or more pixels of the second block based on the respective first weight for the two or more pixels of the first block and the respective second weight for the two or more pixels of the second block to generate a prediction signal (1906). For example, the processing circuitry of video encoder 200 or video decoder 300 may multiply the pixel values of pixels in the first block with respective first weight and multiply the pixel values of pixels in the second block with respective second weight, and perform similar operations if there are more than two candidate blocks. The processing circuitry may then determine a weighted average to fuse the two or more pixels of the first block and the two or more pixels of the second block to generate a prediction signal. In some examples, the processing circuitry of video encoder 200 may signal and the processing circuitry of video decoder 300 may parse a flag indicating that position-dependent fusion is applied. The processing circuitry of video encoder 200 or video decoder 300 may fuse in a condition where the flag indicates that position-dependent fusion is applied.

The processing circuitry of video encoder 200 or video decoder 300 may encode or decode the current block based on the prediction signal (1908). For example, the processing circuitry of video decoder 300 may determine, based on information signaled in a bitstream, residual values indicative of a difference between the current block and the prediction signal, and add the residual values to the prediction signal to reconstruct the current block. The processing circuitry of video encoder 200 may determine residual values indicative of a difference between the current block and the prediction signal, and signal, in a bitstream, information indicative of the residual values.

Figure 20:
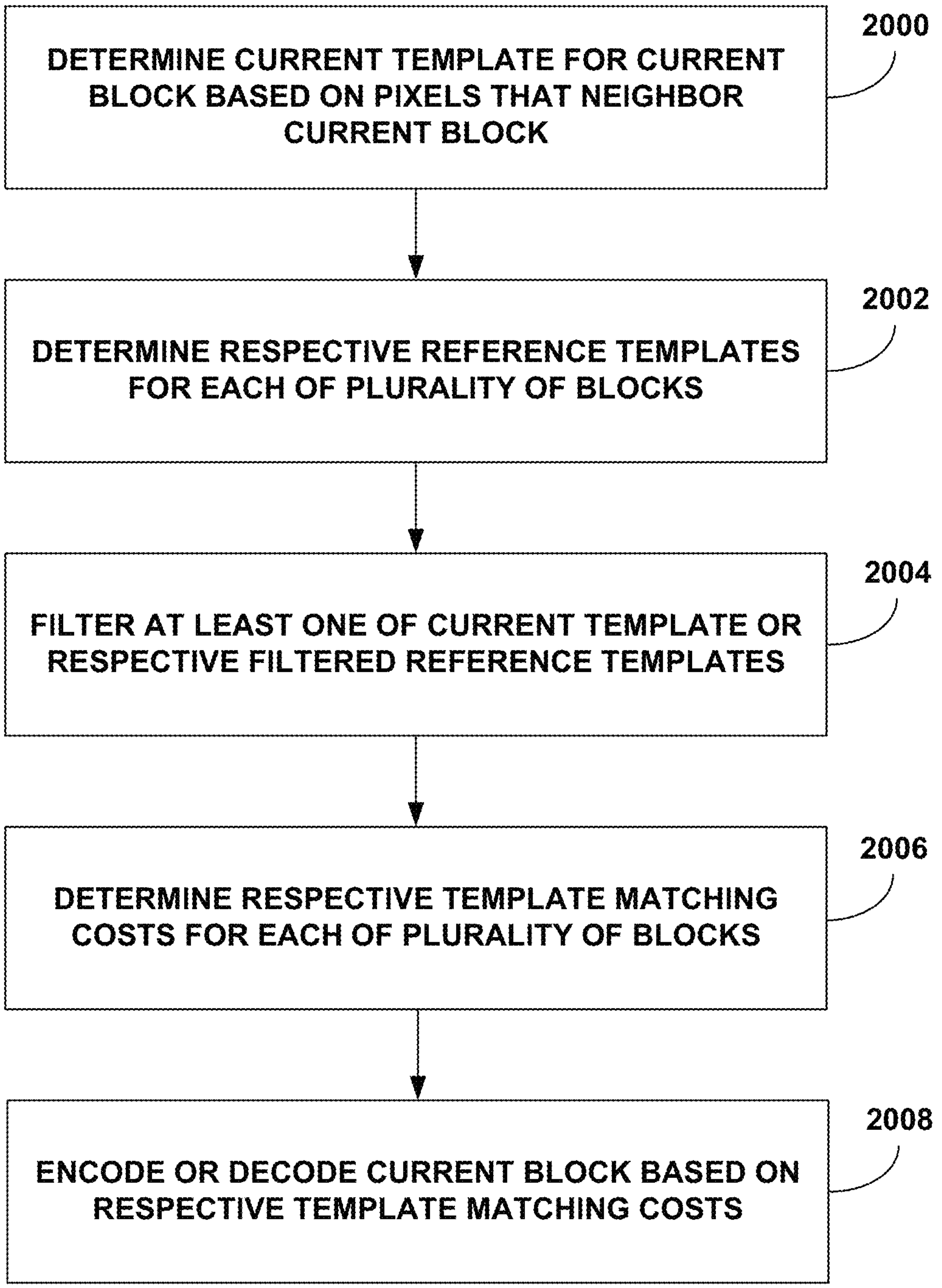
FIG. 20 is a flowchart illustrating an example method of operation.

FIG. 20 is a flowchart illustrating an example method of operation. One or more memories (e.g., memory 106, memory 120, video data memory 230, decoded picture buffer 218, CPB memory 320, DPB 314, or some other memory) may be configured to store the video data. Processing circuitry of video encoder 200 or video decoder 300 may be coupled to the one or memories.

The processing circuitry of video encoder 200 or video decoder 300 may determine a current template for a current block based on pixels that neighbor the current block (2000). For instance, FIG. 7 illustrates an example of a current template for a current block.

The processing circuitry of video encoder 200 or video decoder 300 may determine respective reference templates for each of a plurality of blocks (2002). For instance, FIG. 7 illustrates an example of a reference template for a block, and the processing circuitry of video encoder 200 or video decoder 300 may similarly determine other reference templates for other blocks of the plurality of blocks.

The processing circuitry of video encoder 200 or video decoder 300 may filter at least one of the current template or the respective reference templates to generate at least one of a filtered current template or respective filtered reference templates (2004). For instance, the processing circuitry processing circuitry of video encoder 200 or video decoder 300 may utilize one of the filters illustrated in FIG. 11A or 11B to filter the current template and the reference templates. As described above, when applying a filter to pixels, the processing circuitry of video encoder 200 and video decoder 300 may center the filter on each pixel within the pixels, and multiply the value of the filter with the corresponding pixel values in the neighborhood (e.g., around the center of the 3×3 filter). The processing circuitry of video encoder 200 and video decoder 300 may sum the result of the multiplication to produce the filtered output value for that pixel.

The processing circuitry of video encoder 200 or video decoder 300 may determine respective template matching costs for each of the plurality of blocks (2006). For example, the processing circuitry of video encoder 200 or video decoder 300 may determine respective template matching costs for each of the plurality of blocks based on the filtered current template and the respective reference templates. The processing circuitry of video encoder 200 or video decoder 300 may determine respective template matching costs for each of the plurality of blocks based on the current template and the respective filtered reference templates. The processing circuitry of video encoder 200 or video decoder 300 may determine respective template matching costs for each of the plurality of blocks based on the filtered current template and the respective filtered reference templates.

The processing circuitry of video encoder 200 or video decoder 300 may encode or decode the current block based on the respective template matching costs (2008). As one example, there may be various coding techniques that use template matching, such as intra-template matching, inter-template matching, adaptive reordering of merge candidates with template matching (ARMC-TM), intra-block copy (IBC) template matching, or template matching for geometric partitioning mode (GPM). The processing circuitry of video encoder 200 or video decoder 300 may encode or decode the current block using one of these video coding techniques, where the processing circuitry of video encoder 200 or video decoder 300 determines the template matching costs for these video coding techniques using the example techniques described in this disclosure.

Figure 21:
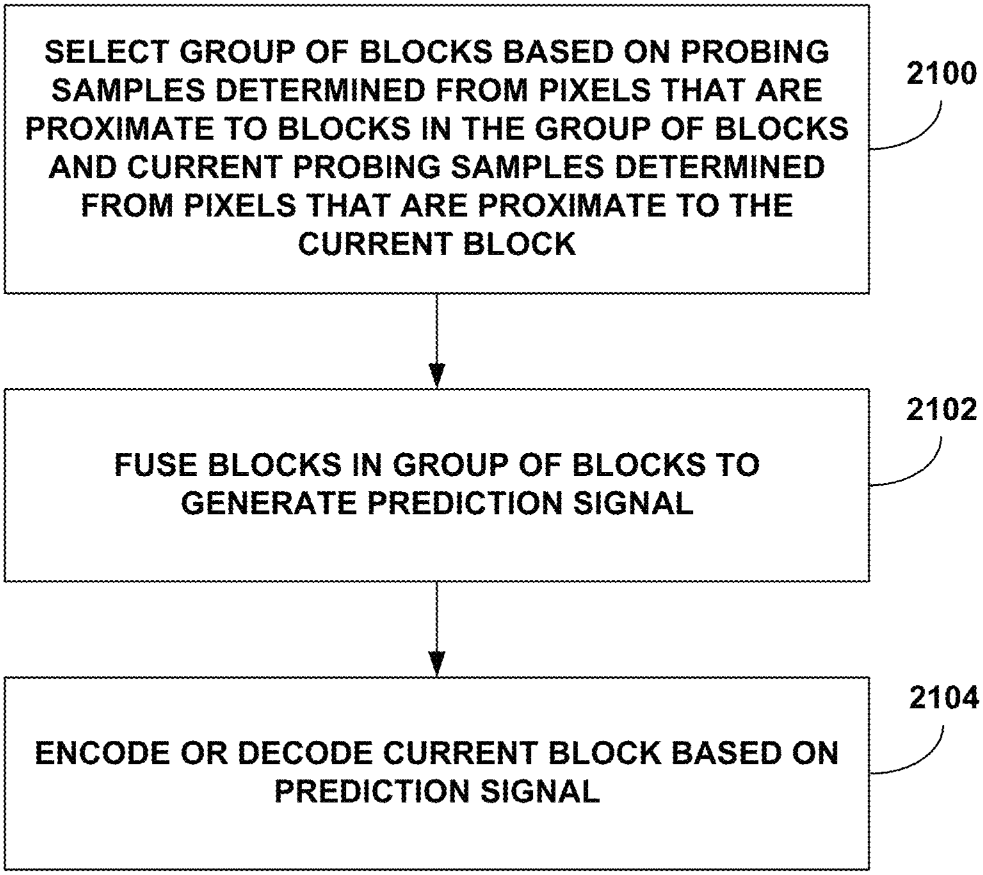
FIG. 21 is a flowchart illustrating an example method of operation.

FIG. 21 is a flowchart illustrating an example method of operation. One or more memories (e.g., memory 106, memory 120, video data memory 230, decoded picture buffer 218, CPB memory 320, DPB 314, or some other memory) may be configured to store the video data. Processing circuitry of video encoder 200 or video decoder 300 may be coupled to the one or memories. For ease of illustrating, reference is made to FIG. 16.

The processing circuitry of video encoder 200 or video decoder 300 may select a group of blocks based on probing samples (e.g., fusing of probing samples) determined from pixels that are proximate to the blocks in the group of blocks and current probing samples determined from pixels that are proximate to a current block (2100). For example, the processing circuitry of video encoder 200 and video decoder 300 may determine first reference probing samples 1604A-1604N for respective blocks 1602A-102N in a first group of blocks 1600, and fuse the first reference probing samples 1604A-1604N to generate first fused probing samples 1618. The processing circuitry of video encoder 200 and video decoder 300 may determine second reference probing samples 1610A-1610N for respective blocks 1608A-1608N in a second group of blocks 1606, and fuse the second reference probing samples 1610A-1610N to generate second fused probing samples 1620. The processing circuitry of video encoder 200 and video decoder 300 may repeat such techniques to generate additional fused probing samples, such as fused probing samples 1622.

In some examples, the probing samples determined from the pixels that are proximate to the blocks in the group of blocks may include probing samples determined from pixels that are immediately adjacent to the blocks in the group of blocks. For instance, as illustrated in FIG. 13, the pixels that are immediately adjacent to the blocks in the group of blocks include a first line of pixels having a y-coordinate that is one less than a y-coordinate of a top line of the group of blocks, or (e.g., and/or) a second line of pixels having a x-coordinate that is one less than a x-coordinate of a left column of the group of blocks.

In some examples, the probing samples determined from the pixels that are proximate to the blocks in the group of blocks include probing samples determined from pixels that are not immediately adjacent to the blocks in the group of blocks. For instance, as illustrated in FIG. 15, the pixels that are not immediately adjacent to the blocks in the group of blocks comprise a first line of pixels having a y-coordinate that is two or more less than a y-coordinate of a top line of the group of blocks, or (e.g., and/or) a second line of pixels having a x-coordinate that is two or more less than a x-coordinate of a left column of the group of blocks.

The processing circuitry of video encoder 200 and video decoder 300 may compare the current probing samples 1626 to the first fused probing samples 1618 to generate a first comparison value, and compare the current probing samples 1626 to the second fused probing samples 1620 to generate a second comparison value. The processing circuitry may repeat such techniques for other comparison values such as the third comparison value.

The processing circuitry of video encoder 200 or video decoder 300 may select the group of blocks based on at least the first comparison value and the second comparison value. For example, the processing circuitry of video encoder 200 or video decoder 300 may select the group of blocks based on the respective comparison values (e.g., first, second, and additional comparison values).

As one example, to select the group of blocks, the processing circuitry of video encoder 200 or video decoder 300 may select the first group of blocks based on the first comparison value being less than the second comparison value. For example, to select the group of blocks, the processing circuitry of video encoder 200 or video decoder 300 may select the first group of blocks based on the first comparison value being the least comparison value of all comparison values.

As another example, to select the group of blocks, the processing circuitry of video encoder 200 or video decoder 300 may order a list of groups of blocks. In this example, the first group of blocks is identified at a lower index value, in the list of groups of blocks, than the second group of blocks based on the first comparison value being less than the second comparison value. For example, the processing circuitry of video encoder 200 or video decoder 300 may identify the first group of blocks in a first entry (e.g., index 0) of the list of groups of blocks based on the first comparison value being the least comparison value of all comparison values. The processing circuitry may select the group of blocks based on the list of groups of blocks. For instance, video encoder 200 may signal and video decoder 300 may receive an index to the list of groups of blocks.

The processing circuitry of video encoder 200 or video decoder 300 may fuse blocks in the group of blocks to generate a prediction signal (2102). For instance, the processing circuitry of video encoder 200 or video decoder 300 may determine a respective weight for each pixel in at least one block of the group of blocks based on a respective location of each pixel, and fuse the blocks based on the respective weight for each pixel in at least one block of the group of blocks, as described above and in FIG. 19. As another example, as part of the fusing, the processing circuitry for video encoder 200 or video decoder 300 may perform filtering as described above and in FIG. 20.

The processing circuitry of video encoder 200 or video decoder 300 may encode or decode the current block based on the prediction signal (2104). For example, the processing circuitry of video decoder 300 may determine, based on information signaled in a bitstream, residual values indicative of a difference between the current block and the prediction signal, and add the residual values to the prediction signal to reconstruct the current block. The processing circuitry of video encoder 200 may determine residual values indicative of a difference between the current block and the prediction signal, and signal, in a bitstream, information indicative of the residual values.

The following numbered clauses illustrate one or more aspects of the devices and techniques described in this disclosure.

Clause 1A. A method of encoding or decoding video data, the method comprising: determining that template matching is enabled for a current block; performing at least one of fusion of multiple candidates padding, filtering, weighting, or position-dependent fusion as part of template matching; and encoding or decoding the current block based on template matching.

Clause 2A. The method of clause 1A, wherein template matching includes one or more of intra-template matching, inter-template matching, adaptive reordering of merge candidates with template matching (ARMC-TM), intra-block copy (IBC) template matching, or template matching for geometric partitioning mode (GPM).

Clause 3A. A device for coding video data, the device comprising memory configured to store the video data; and one or more processors implemented in circuitry and configured to perform the method of any of clauses 1A and 2A.

Clause 4A. The device of clause 3A, further comprising a display configured to display decoded video data.

Clause 5A. The device of any of clauses 3A and 4A, wherein the device comprises one or more of a camera, a computer, a mobile device, a broadcast receiver device, or a set-top box.

Clause 6A. A computer-readable storage medium having stored thereon instructions that, when executed, cause one or more processors to perform the method of any of clause 1A and 2A.

Clause 7A. A device for encoding or decoding video data, the device comprising means for performing the method of any of clauses 1A and 2A.

Clause 1B. A method of decoding video data, the method comprising: determining a template matching prediction mode for a current block of video data using a probing scheme; and decoding the current block using the determined template matching prediction mode.

Clause 2B. The method of clause 1B, wherein determining the template matching prediction mode comprises determining the template matching prediction mode directly from the probing scheme.

Clause 3B. The method of clause 1B, wherein determining the template matching prediction mode comprises determining a most likely template matching prediction mode using the probing scheme; and coding data indicating whether the most likely template matching prediction mode is to be used to decode the current block.

Clause 4B. The method of clause 3B, further comprising sorting a set of candidate template matching prediction modes according to the probing scheme, wherein coding the data comprises coding an index into the sorted set of candidate template matching prediction modes, the index representing an actual template matching prediction mode to be used to decode the current block.

Clause 5B. The method of any of clauses 1B-4B, wherein determining the template matching prediction mode for the current block using the probing scheme comprises calculating data representative of a difference between probing pixels of the current block determined according to a template and corresponding pixels of a reference block determined according to the template.

Clause 6B. The method of clause 5B, further comprising: calculating a set of differences between the probing pixels of the current block determined according to a template and corresponding pixels of candidate reference blocks determined according to the template; and selecting a reference block having a smallest difference from the candidate reference blocks as an actual reference block for the current block.

Clause 7B. The method of any of clauses 5B and 6B, wherein the difference comprises a sum of absolute differences (SAD) value or a sum of squared error (SSE) value.

Clause 8B. The method of any of clauses 5B-7B, wherein the template indicates pixels above a corresponding block and to the left of the corresponding block.

Clause 9B. The method of any of clauses 5B-8B, wherein the template corresponds to the template of any of FIG. 13 or 15.

Clause 10B. The method of any of clauses 5B-9B, wherein the template indicates pixels adjacent to the corresponding block and does not include pixels that are not adjacent to the corresponding block.

Clause 11B. The method of any of clauses 5B-9B, wherein the template indicates pixels adjacent to the corresponding block and one or more lines of pixels that are not adjacent to the corresponding block.

Clause 12B. The method of clause 11B, wherein the one or more lines include a second line and a fourth line in the template.

Clause 13B. The method of clause 11B, wherein the one or more lines include a third line and a fourth line in the template.

Clause 14B. The method of any of clauses 5B-13B, wherein the template excludes reference samples of the reference block.

Clause 15B. The method of any of clauses 5B-13B, wherein the template includes one or more of the samples of the reference block.

Clause 16B. The method of any of clauses 1B-15B, further comprising sorting a fusion candidate list according to the probing scheme and coding a value for a syntax element indicating one of the fusion candidates in the sorted fusion candidate list.

Clause 17B. The method of clause 16B, wherein the fusion candidate list includes one or more of a fusion candidate using a template matching cost to derive fusion weights, a fusion candidate using mean squared error (MSE) to derive fusion weights, a fusion candidate including location information in a filtering process, a fusion candidate including a spatial pixel in the filtering process, or a fusion candidate including a gradient derived from a current pixel or the spatial pixel in the filtering process.

Clause 18B. The method of clause 17B, wherein the location information contains at least one of a horizontal position, a vertical position, or the horizontal position times the vertical position.

Clause 19B. The method of clause 17B, wherein a location indicated by the location information is relative to an upper-left position of the current block.

Clause 20B. The method of clause 17B, wherein a location indicated by the location information is relative to an upper-left position of the template.

Clause 21B. The method of any of clauses 17B-20B, wherein a spatial pixel contains at least one of an above, right-neighboring, left-neighboring, or below pixel.

Clause 22B. The method of any of clauses 16B-21B, wherein the one of the fusion candidates indicates that N candidates are to be fused within one coding mode.

Clause 23B. The method of any of clauses 16B-21B, wherein the one of the fusion candidates indicates that N candidates are to be fused across two or more coding modes.

Clause 24B. The method of any of clauses 22B and 23B, wherein the N candidates include any combination of block vector candidates or motion vector candidates.

Clause 25B. The method of any of clauses 16B-24B, further comprising forming the fusion candidate list, including omitting potential fusion candidates from inclusion in the fusion candidate list according to one or more conditions.

Clause 26B. The method of any of clauses 16B-25B, further comprising: determining whether a ratio of a minimum template cost among all block vector fusion candidates for the current block and a minimum template cost among all block vector fusion candidates in the fusion candidate list is larger than a threshold; and when the ratio is larger than the threshold, removing a fusion candidate from the fusion candidate list.

Clause 27B. The method of any of clauses 16B-26B, further comprising determining a fusion candidate from the fusion candidate list without coding an index representative of the fusion candidate.

Clause 28B. The method of any of clauses 16B-26B, further comprising: comprising sorting the fusion candidate list according to the probing scheme; and coding an index representing a fusion candidate in the sorted fusion candidate list.

Clause 29B. The method of clause 28B, wherein coding the index comprises: coding a first value indicating whether a most likely fusion candidate at a top of the sorted fusion candidate list is to be used for the current block; and when the first value indicates that the most likely fusion candidate is not to be used, coding a second value indicating an actual fusion candidate from the sorted fusion candidate list that is to be used for the current block.

Clause 30B. The method of clause 28B, wherein coding the index comprises: coding a first value indicating whether a most likely fusion candidate at a top of the sorted fusion candidate list is to be used for the current block; and when the first value indicates that the most likely fusion candidate is not to be used, coding a second value indicating an actual fusion candidate from the unsorted fusion candidate list that is to be used for the current block.

Clause 31B. The method of any of clauses 1B-30B, further comprising coding a value for a syntax element indicating that the probing scheme is enabled.

Clause 32B. The method of any of clauses 1B-31B, further comprising adding a delta value to one or more weights in a fusion filter, wherein determining the template matching prediction mode for the current block using the probing scheme comprises performing the probing scheme after adding the delta value to the weights in the fusion filter.

Clause 33B. The method of clause 32B, further comprising determining the delta value from a range of potential delta values according to a first coefficient in the fusion filter.

Clause 34B. The method of any of clauses 32B and 33B, further comprising determining the delta value according to a template matching cost, wherein adding the delta value comprises adding the delta value to a first coefficient in the fusion filter, the method further comprising subtracting the delta value from a second coefficient in the fusion filter.

Clause 35B. The method of any of clauses 32B and 33B, further comprising determining the delta value according to a mean squared error (MSE) minimization, wherein adding the delta value comprises adding the delta value to a first coefficient in the fusion filter, the method further comprising subtracting a bias term by one of (delta*pixel value) or (delta*pixel value/(maximum value/2)).

Clause 36B. The method of clause 35B, wherein the pixel value is one of a mean value of the template, a value of a predefined pixel in the template, or a predefined value.

Clause 37B. The method of clause 36B, wherein the predefined value comprises the maximum value divided by 2.

Clause 38B. The method of any of clauses 32B-37B, further comprising coding a value for a syntax element indicating that the weights in the fusion filter are to be adjusted.

Clause 39B. The method of any of clauses 1B-38B, further comprising determining weight values during a template matching cost calculation based on a pixel or line position in the template.

Clause 40B. The method of clause 39B, further comprising determining a weighting factor for each line according to a distance between the line and a boundary of the current block.

Clause 41B. The method of clause 40B, further comprising multiplying a cost of a line adjacent to the current block by the weighting factor.

Clause 42B. The method of any of clauses 1B-41B, further comprising encoding the current block prior to decoding the current block.

Clause 43B. A device for decoding video data, the device comprising one or more means for performing the method of any of clauses 1B-42B.

Clause 44B. The device of clause 43B, wherein the one or more means comprise a processing system comprising one or more processors implemented in circuitry.

Clause 45B. The device of any of clauses 43B and 44B, further comprising a display configured to display the decoded video data.

Clause 46B. The device of any of clauses 43B-45B, wherein the device comprises one or more of a camera, a computer, a mobile device, a broadcast receiver device, or a set-top box.

Clause 47B. The device of clause 43B-46B, further comprising a memory configured to store the video data.

Clause 48B. A computer-readable storage medium having stored thereon instructions that, when executed, cause a processor of a device for decoding video data to perform the method of any of clauses 1B-42B.

Clause 49B. A device for decoding video data, the device comprising: means for determining a template matching prediction mode for a current block of video data using a probing scheme; and means for decoding the current block using the determined template matching prediction mode.

Clause 1C. A method of encoding or decoding video data, the method comprising: determining, for a current block, a plurality of blocks for fusing; determining a respective first weight for two or more pixels of a first block of the plurality of blocks based on a respective position of the two or more pixels of the first block; determining a respective second weight for two or more pixels of a second block of the plurality of blocks; fusing the two or more pixels of the first block and the two or more pixels of the second block based on the respective first weight for the two or more pixels of the first block and the respective second weight for the two or more pixels of the second block to generate a prediction signal; and encoding or decoding the current block based on the prediction signal.

Clause 2C. The method of clause 1C, wherein determining the respective second weight comprises determining the respective second weight for the two or more pixels of the second block of the plurality of blocks based on a respective position of the two or more pixels of the second block.

Clause 3C. The method of clause 1C, wherein determining the respective second weight comprises setting the respective second weight for all of the two or more pixels of the second block to be the same.

Clause 4C. The method of any of clauses 1C-4C, wherein a respective first weight for a first pixel of the first block and a respective first weight for a second pixel of the first block is different.

Clause 5C. The method of any of clauses 1C-4C, wherein determining the respective first weight for the two or more pixels of the first block comprises determining the respective first weight for the two or more pixels of the first block based on the respective position of the two or more pixels of the first block and a candidate value of the first block.

Clause 6C. The method of any of clauses 1C-5C, wherein the respective position of the two or more pixels of the first block comprises a respective x-coordinate and a respective y-coordinate, and wherein determining the respective first weight comprises determining a third weight for the first block; and determining a value based on: the respective x-coordinate and a width of the first block; or the respective y-coordinate and a height of the first block; and determining the respective first weight based on the value and the third weight.

Clause 7C. The method of clause 6C, wherein determining the value comprises multiplying a ratio of the respective x-coordinate to the width of the first block with the third weight.

Clause 8C. The method of clause 6C, wherein determining the value comprises multiplying a ratio of the respective y-coordinate to the height of the first block with the third weight.

Clause 9C. The method of any of clauses 1C-8C, further comprising: signaling or parsing a flag indicating that position-dependent fusion is applied, wherein fusing comprises fusing in a condition where the flag indicates that position-dependent fusion is applied.

Clause 10C. The method of any of clauses 1C-9C, wherein determining, for the current block, the plurality of blocks for fusing comprises comparing a current template based on pixels that neighbor the current block to respective reference templates that neighbor respective blocks of a group of blocks; and determining the plurality of blocks for fusing, from the group of blocks, based on the comparing of the current template based on pixels that neighbor the current block to respective reference templates that neighbor respective blocks of the group of blocks.

Clause 11C. The method of clause 10C, further comprising: filtering at least one of the current template or the respective reference templates to generate at least one of a filtered current template or respective filtered reference templates, wherein comparing comprises one of: comparing the filtered current template to the respective reference templates; comparing the current template to the respective filtered reference templates; or comparing the filtered current template to the respective filtered reference templates.

Clause 12C. The method of any of clauses 1C-11C, wherein encoding or decoding the current block based on the prediction signal comprises decoding the current block, wherein decoding the current block comprises determining, based on information signaled in a bitstream, residual values indicative of a difference between the current block and the prediction signal; and adding the residual values to the prediction signal to reconstruct the current block.

Clause 13C. The method of any of clauses 1C-11C, wherein encoding or decoding the current block based on the prediction signal comprises encoding the current block, wherein encoding the current block comprises determining residual values indicative of a difference between the current block and the prediction signal; and signaling, in a bitstream, information indicative of the residual values.

Clause 14C. The method of any of clauses 1C-13C, wherein determining the plurality of blocks for fusing comprises determining probing samples based on pixels that are proximate to the plurality of blocks; fusing the probing samples to generate fused probing samples; and determining the plurality of blocks, from among a plurality of groups of blocks, based on the fused probing samples.

Clause 15C. A device for encoding or decoding video data, the device comprising: one or more memories configured to store the video data; and processing circuitry coupled to the one or more memories, wherein the processing circuitry is configured to determine, for a current block, a plurality of blocks for fusing; determine a respective first weight for two or more pixels of a first block of the plurality of blocks based on a respective position of the two or more pixels of the first block; determine a respective second weight for two or more pixels of a second block of the plurality of blocks; fuse the two or more pixels of the first block and the two or more pixels of the second block based on the respective first weight for the two or more pixels of the first block and the respective second weight for the two or more pixels of the second block to generate a prediction signal; and encode or decode the current block based on the prediction signal.

Clause 16C. The device of clause 15C, wherein to determine the respective second weight, the processing circuitry is configured to determine the respective second weight for the two or more pixels of the second block of the plurality of blocks based on a respective position of the two or more pixels of the second block.

Clause 17C. The device of clause 15C, wherein to determine the respective second weight, the processing circuitry is configured to set the respective second weight for all of the two or more pixels of the second block to be the same.

Clause 18C. The device of any of clauses 15C-17C, wherein a respective first weight for a first pixel of the first block and a respective first weight for a second pixel of the first block is different.

Clause 19C. The device of any of clauses 15C-18C, wherein to determine the respective first weight for the two or more pixels of the first block, the processing circuitry is configured to determine the respective first weight for the two or more pixels of the first block based on the respective position of the two or more pixels of the first block and a candidate value of the first block.

Clause 20C. A method of encoding or decoding video data, the method comprising: determining a current template for a current block based on pixels that neighbor the current block; determining respective reference templates for each of a plurality of blocks; filtering at least one of the current template or the respective reference templates to generate at least one of a filtered current template or respective filtered reference templates; determining respective template matching costs for each of the plurality of blocks based on one of: the filtered current template and the respective reference templates; the current template and the respective filtered reference templates; or the filtered current template and the respective filtered reference templates; and encoding or decoding the current block based on the respective template matching costs.

Clause 1D. A method of encoding or decoding video data, the method comprising: selecting a group of blocks based on probing samples determined from pixels that are proximate to the blocks in the group of blocks and current probing samples determined from pixels that are proximate to a current block; fusing the blocks in the group of blocks to generate a prediction signal; and encoding or decoding the current block based on the prediction signal.

Clause 2D. The method of clause 1D, wherein selecting the group of blocks comprises determining first reference probing samples for respective blocks in a first group of blocks; fusing the first reference probing samples to generate first fused probing samples; determining second reference probing samples for respective blocks in a second group of blocks; fusing the second reference probing samples to generate second fused probing samples; comparing the current probing samples to the first fused probing samples to generate a first comparison value; comparing the current probing samples to the second fused probing samples to generate a second comparison value; and selecting the group of blocks based on at least the first comparison value and the second comparison value.

Clause 3D. The method of clause 2D, wherein selecting the group of blocks comprises selecting the first group of blocks based on the first comparison value being less than the second comparison value.

Clause 4D. The method of clause 2D, wherein selecting the group of blocks comprises ordering a list of groups of blocks, wherein the first group of blocks is identified at a lower index value, in the list of groups of blocks, than the second group of blocks based on the first comparison value being less than the second comparison value; and selecting the group of blocks based on the list of groups of blocks.

Clause 5D. The method of any of clauses 1D-4D, wherein the probing samples determined from the pixels that are proximate to the blocks in the group of blocks comprise probing samples determined from pixels that are immediately adjacent to the blocks in the group of blocks.

Clause 6D. The method of clause 5D, wherein the pixels that are immediately adjacent to the blocks in the group of blocks comprises a first line of pixels having a y-coordinate that is one less than a y-coordinate of a top line of the group of blocks, or a second line of pixels having a x-coordinate that is one less than a x-coordinate of a left column of the group of blocks.

Clause 7D. The method of any of clauses 1D-6D, wherein the probing samples determined from the pixels that are proximate to the blocks in the group of blocks comprise probing samples determined from pixels that are not immediately adjacent to the blocks in the group of blocks.

Clause 8D. The method of clause 7D, wherein the pixels that are not immediately adjacent to the blocks in the group of blocks comprise a first line of pixels having a y-coordinate that is two or more less than a y-coordinate of a top line of the group of blocks, or a second line of pixels having a x-coordinate that is two or more less than a x-coordinate of a left column of the group of blocks.

Clause 9D. The method of any of clauses 1D-8D, wherein fusing the blocks in the group of blocks comprises determining a respective weight for each pixel in at least one block of the group of blocks based on a respective location of each pixel; and fusing the blocks based on the respective weight for each pixel in at least one block of the group of blocks.

Clause 10D. The method of any of clauses 1D-9D, wherein encoding or decoding the current block comprises decoding the current block, wherein decoding the current block comprises determining, based on information signaled in a bitstream, residual values indicative of a difference between the current block and the prediction signal; and adding the residual values to the prediction signal to reconstruct the current block.

Clause 11D. The method of any of clauses 1D-9D, wherein encoding or decoding the current block comprises encoding the current block, wherein encoding the current block comprises determining residual values indicative of a difference between the current block and the prediction signal; and signaling, in a bitstream, information indicative of the residual values.

Clause 12D. A device for encoding or decoding video data, the device comprising: one or more memories configured to store the video data; and processing circuitry coupled to the one or more memories, wherein the processing circuitry is configured to select a group of blocks based on probing samples determined from pixels that are proximate to the blocks in the group of blocks and current probing samples determined from pixels that are proximate to a current block; fuse the blocks in the group of blocks to generate a prediction signal; and encode or decode the current block based on the prediction signal.

Clause 13D. The device of clause 12D, wherein to select the group of blocks, the processing circuitry is configured to determine first reference probing samples for respective blocks in a first group of blocks; fuse the first reference probing samples to generate first fused probing samples; determine second reference probing samples for respective blocks in a second group of blocks; fuse the second reference probing samples to generate second fused probing samples; compare the current probing samples to the first fused probing samples to generate a first comparison value; compare the current probing samples to the second fused probing samples to generate a second comparison value; and select the group of blocks based on at least the first comparison value and the second comparison value.

Clause 14D. The device of clause 13D, wherein to select the group of blocks, the processing circuitry is configured to select the first group of blocks based on the first comparison value being less than the second comparison value.

Clause 15D. The device of clause 13D, wherein to select the group of blocks, the processing circuitry is configured to order a list of groups of blocks, wherein the first group of blocks is identified at a lower index value, in the list of groups of blocks, than the second group of blocks based on the first comparison value being less than the second comparison value; and select the group of blocks based on the list of groups of blocks.

Clause 16D. The device of any of clauses 12D-15D, wherein the probing samples determined from the pixels that are proximate to the blocks in the group of blocks comprise probing samples determined from pixels that are immediately adjacent to the blocks in the group of blocks.

Clause 17D. The device of clause 16D, wherein the pixels that are immediately adjacent to the blocks in the group of blocks comprises a first line of pixels having a y-coordinate that is one less than a y-coordinate of a top line of the group of blocks, or a second line of pixels having a x-coordinate that is one less than a x-coordinate of a left column of the group of blocks.

Clause 18D. The device of any of clauses 12D-17D, wherein the probing samples determined from the pixels that are proximate to the blocks in the group of blocks comprise probing samples determined from pixels that are not immediately adjacent to the blocks in the group of blocks.

Clause 19D. The device of clause 18D, wherein the pixels that are not immediately adjacent to the blocks in the group of blocks comprise a first line of pixels having a y-coordinate that is two or more less than a y-coordinate of a top line of the group of blocks, or a second line of pixels having a x-coordinate that is two or more less than a x-coordinate of a left column of the group of blocks.

Clause 20D. A non-transitory computer-readable storage medium storing instructions thereon that when executed cause one or more processors to select a group of blocks based on probing samples determined from pixels that are proximate to the blocks in the group of blocks and current probing samples determined from pixels that are proximate to a current block; fuse the blocks in the group of blocks to generate a prediction signal; and encode or decode the current block based on the prediction signal.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:

selecting a group of blocks based on probing samples determined from pixels that are proximate to the blocks in the group of blocks and current probing samples determined from pixels that are proximate to a current block, wherein selecting the group of blocks comprises:

determining first reference probing samples for respective blocks in a first group of blocks;

fusing the first reference probing samples to generate first fused probing samples;

determining second reference probing samples for respective blocks in a second group of blocks;

fusing the second reference probing samples to generate second fused probing samples;

comparing the current probing samples to the first fused probing samples to generate a first comparison value;

comparing the current probing samples to the second fused probing samples to generate a second comparison value; and selecting the group of blocks based on at least the first comparison value and the second comparison value;

fusing the blocks in the group of blocks to generate a prediction signal; and encoding or decoding the current block based on the prediction signal.

2. The method of claim 1, wherein selecting the group of blocks comprises:

selecting the first group of blocks based on the first comparison value being less than the second comparison value.

3. The method of claim 1, wherein selecting the group of blocks comprises:

ordering a list of groups of blocks, wherein the first group of blocks is identified at a lower index value, in the list of groups of blocks, than the second group of blocks based on the first comparison value being less than the second comparison value; and selecting the group of blocks based on the list of groups of blocks.

4. The method of claim 1, wherein the probing samples determined from the pixels that are proximate to the blocks in the group of blocks comprise probing samples determined from pixels that are immediately adjacent to the blocks in the group of blocks.

5. The method of claim 4, wherein the pixels that are immediately adjacent to the blocks in the group of blocks comprises a first line of pixels having a y-coordinate that is one less than a y-coordinate of a top line of the group of blocks, or a second line of pixels having a x-coordinate that is one less than a x-coordinate of a left column of the group of blocks.

6. The method of claim 1, wherein the probing samples determined from the pixels that are proximate to the blocks in the group of blocks comprise probing samples determined from pixels that are not immediately adjacent to the blocks in the group of blocks.

7. The method of claim 6, wherein the pixels that are not immediately adjacent to the blocks in the group of blocks comprise a first line of pixels having a y-coordinate that is two or more less than a y-coordinate of a top line of the group of blocks, or a second line of pixels having a x-coordinate that is two or more less than a x-coordinate of a left column of the group of blocks.

8. The method of claim 1, wherein fusing the blocks in the group of blocks comprises:

determining a respective weight for each pixel in at least one block of the group of blocks based on a respective location of each pixel; and fusing the blocks based on the respective weight for each pixel in at least one block of the group of blocks.

9. The method of claim 1, wherein encoding or decoding the current block comprises decoding the current block, wherein decoding the current block comprises:

determining, based on information signaled in a bitstream, residual values indicative of a difference between the current block and the prediction signal; and adding the residual values to the prediction signal to reconstruct the current block.

10. The method of claim 1, wherein encoding or decoding the current block comprises encoding the current block, wherein encoding the current block comprises:

determining residual values indicative of a difference between the current block and the prediction signal; and signaling, in a bitstream, information indicative of the residual values.

11. A device for encoding or decoding video data, the device comprising:

one or more memories configured to store the video data; and processing circuitry coupled to the one or more memories, wherein the processing circuitry is configured to:

select a group of blocks based on probing samples determined from pixels that are proximate to the blocks in the group of blocks and current probing samples determined from pixels that are proximate to a current block, wherein to select the group of blocks, the processing circuitry is configured to:

determine first reference probing samples for respective blocks in a first group of blocks;

fuse the first reference probing samples to generate first fused probing samples;

determine second reference probing samples for respective blocks in a second group of blocks;

fuse the second reference probing samples to generate second fused probing samples;

compare the current probing samples to the first fused probing samples to generate a first comparison value;

compare the current probing samples to the second fused probing samples to generate a second comparison value; and select the group of blocks based on at least the first comparison value and the second comparison value;

fuse the blocks in the group of blocks to generate a prediction signal; and encode or decode the current block based on the prediction signal.

12. The device of claim 11, wherein to select the group of blocks, the processing circuitry is configured to:

select the first group of blocks based on the first comparison value being less than the second comparison value.

13. The device of claim 11, wherein to select the group of blocks, the processing circuitry is configured to:

order a list of groups of blocks, wherein the first group of blocks is identified at a lower index value, in the list of groups of blocks, than the second group of blocks based on the first comparison value being less than the second comparison value; and select the group of blocks based on the list of groups of blocks.

14. The device of claim 11, wherein the probing samples determined from the pixels that are proximate to the blocks in the group of blocks comprise probing samples determined from pixels that are immediately adjacent to the blocks in the group of blocks.

15. The device of claim 14, wherein the pixels that are immediately adjacent to the blocks in the group of blocks comprises a first line of pixels having a y-coordinate that is one less than a y-coordinate of a top line of the group of blocks, or a second line of pixels having a x-coordinate that is one less than a x-coordinate of a left column of the group of blocks.

16. The device of claim 11, wherein the probing samples determined from the pixels that are proximate to the blocks in the group of blocks comprise probing samples determined from pixels that are not immediately adjacent to the blocks in the group of blocks.

17. The device of claim 16, wherein the pixels that are not immediately adjacent to the blocks in the group of blocks comprise a first line of pixels having a y-coordinate that is two or more less than a y-coordinate of a top line of the group of blocks, or a second line of pixels having a x-coordinate that is two or more less than a x-coordinate of a left column of the group of blocks.

18. A non-transitory computer-readable storage medium storing instructions thereon that when executed cause one or more processors to:

select a group of blocks based on probing samples determined from pixels that are proximate to the blocks in the group of blocks and current probing samples determined from pixels that are proximate to a current block, wherein the instructions that cause the one or more processors to select the group of blocks comprise instructions that cause the one or more processors to:

determine first reference probing samples for respective blocks in a first group of blocks;

fuse the first reference probing samples to generate first fused probing samples;

determine second reference probing samples for respective blocks in a second group of blocks;

fuse the second reference probing samples to generate second fused probing samples;

compare the current probing samples to the first fused probing samples to generate a first comparison value;

compare the current probing samples to the second fused probing samples to generate a second comparison value; and select the group of blocks based on at least the first comparison value and the second comparison value;

fuse the blocks in the group of blocks to generate a prediction signal; and encode or decode the current block based on the prediction signal.

* * * * *